United States Patent [19]

Dischert et al.

[11] Patent Number: 4,745,462
[45] Date of Patent: May 17, 1988

[54] IMAGE STORAGE USING SEPARATELY SCANNED COLOR COMPONENT VARIABLES

[75] Inventors: Robert A. Dischert, Burlington; David L. Sprague, Hopewell; Lawrence D. Ryan, Princeton Junction; Nicola J. Fedele, Kingston, all of N.J.

[73] Assignee: RCA Corporation, Princeton, N.J.

[21] Appl. No.: 20,639

[22] Filed: Mar. 2, 1987

[51] Int. Cl.⁴ .............................................. H04N 9/64
[52] U.S. Cl. ................................. 358/21 R; 340/703; 340/798
[58] Field of Search .................... 358/12, 13, 14, 21 R, 358/22; 340/703, 798, 799

[56] References Cited

U.S. PATENT DOCUMENTS

| 2,554,693 | 5/1951 | Bedford | 358/15 |
| 2,635,140 | 4/1953 | Dome | 358/15 |
| 4,673,930 | 6/1987 | Bujalski et al. | 340/703 |

FOREIGN PATENT DOCUMENTS 0070718  6/1978  Japan ..................................... 358/13

OTHER PUBLICATIONS

I. G. Brown, Primary Signal Component Coding, 1980 International Broadcasting Convention Conference Publication 191, pp. 344-349.

M. F. Cowlishaw, "Fundamental Requirements of Picture Presentation", *Proceedings of the SID,* vol. 26/2, 1985, pp. 105-107.

D. E. Troxel et al., "A Two-Channel Picture Coding System: I-Real-Time Implementation", *IEEE Transactions on Communications,* vol. COM-29, No. 12, Dec. 1981, pp. 1841-1848.

*Primary Examiner*—John W. Shepperd
*Attorney, Agent, or Firm*—E. M. Whitacre; P. J. Rasmussen; E. P. Herrmann

[57] ABSTRACT

Computer main memory is used for storing relatively densely sampled green and detail information concerning a television display and for storing relatively sparsely sampled red information and blue information concerning the same television display. The relatively densely sampled green and detail information is read out in substantially real-time from computer main memory during line trace intervals in the television display. The relatively sparsely sampled red information and blue information are read out of computer main memory in advanced and compressed time during selected line retrace intervals in the television display.

10 Claims, 12 Drawing Sheets

| 1ST G & DETAIL SCAN LINE, ODD FRAME | 2ND G & DETAIL SCAN LINE, ODD FRAME |
|---|---|
| 3RD G & DETAIL SCAN LINE, ODD FRAME | 4TH G & DETAIL SCAN LINE, ODD FRAME |

| (4P-1)TH G & DETAIL SCAN LINE, ODD FRAME | 4PTH G & DETAIL SCAN LINE, ODD FRAME |
|---|---|
| (4P+1)TH G & DETAIL SCAN LINE, ODD FRAME | 1ST G & DETAIL SCAN LINE, EVEN FRAME |
| 2ND G & DETAIL SCAN LINE, EVEN FRAME | 3RD G & DETAIL SCAN LINE, EVEN FRAME |

| | (4P-2)TH G & DETAIL SCAN LINE, EVEN FRAME | | | | (4P-1)TH G & DETAIL SCAN LINE, EVEN FRAME | | |
|---|---|---|---|---|---|---|---|
| | 4PTH G & DETAIL SCAN LINE, EVEN FRAME | | | | (4P+1)TH G & DETAIL SCAN LINE, EVEN FRAME | | |
| 1ST R S.L. | 1ST B S.L. | 2ND R S.L. | 2ND B S.L. | 3RD R S.L. | 3RD B S.L. | 4TH R S.L. | 4TH B S.L. |
| 5TH R S.L. | 5TH B S.L. | 6TH R S.L. | 6TH B S.L. | 7TH R S.L. | 7TH B S.L. | 8TH R S.L. | 8TH B S.L. |

ODD FRAME CHROMA

| (P-6)TH R S.L. | (P-6)TH B S.L. | (P-5)TH R S.L. | (P-5)TH B S.L. | (P-4)TH R S.L. | (P-4)TH B S.L. | (P-3)TH R S.L. | (P-3)TH B S.L. |
|---|---|---|---|---|---|---|---|
| (P-2)TH R S.L. | (P-2)TH B S.L. | (P-1)TH R S.L. | (P-1)TH B S.L. | PTH R S.L. | PTH B S.L. | (P+1)TH R S.L. | (P+1)TH B S.L. |
| 1ST R S.L. | 1ST B S.L. | 2ND R S.L. | 2ND B S.L. | 3RD R S.L. | 3RD B S.L. | 4TH R S.L. | 4TH B S.L. |
| 5TH R S.L. | 5TH B S.L. | 6TH R S.L. | 6TH B S.L. | 7TH R S.L. | 7TH B S.L. | 8TH R S.L. | 8TH B S.L. |

EVEN FRAME CHROMA

| (P-6)TH R S.L. | (P-6)TH B S.L. | (P-5)TH R S.L. | (P-5)TH B S.L. | (P-4)TH R S.L. | (P-4)TH B S.L. | (P-3)TH R S.L. | (P-3)TH B S.L. |
|---|---|---|---|---|---|---|---|
| (P-2)TH R S.L. | (P-2)TH B S.L. | (P-1)TH R S.L. | (P-1)TH B S.L. | PTH R S.L. | PTH B S.L. | (P+1)TH R S.L. | (P+1)TH B S.L. |

IMAGE STORAGE USING SEPARATELY SCANNED COLOR COMPONENT VARIABLES

The invention relates to image storage in television display systems as may, by way of example, be used in computer apparatus.

BACKGROUND OF THE INVENTION

The graphic images used in computer-generated displays have been stored in image memories at address locations mapping respective points at regular intervals along the raster scanning of a display image space. Each addressed location in image memory has contained a digital word, at least a portion of which has encoded the brightness, hue and saturation of a color picture element (or "pixel") at the corresponding point in image space (and, in run-length encoding schemes, the value of succeeding pixels). A number of different schemes for encoding the brightness, hue and saturation of color pixels exist in the prior art.

One may analyze each color pixel as the sum of the three additive primary colors, red, green and blue, for example. The amplitudes of the red, green and blue components may each be coded in a number n of bits, n normally being in the range five to eight inclusive. Coding may be linear, logarithmic, or in accordance with some other function. It is also known to linearly encode red, green and blue in different numbers p, q and r of bits depending on their relative contributions to luminance. Encoding green in seven bits, red in six bits and blue in five bits is an example of such coding, which provides luminance with nearly eight bits of amplitude resolution. There are 217 levels in luminance, assuming it to be comprised of 59% green, 30% red and 11% blue in accordance with the NTSC standard. This compares favorably with the 219 levels in luminance for eight-bit coding of luminance using level 35 as black and level 254 as white, as recommended by the Society of Motion Picture and Television Engineers (SMPTE). This amplitude resolution in luminance is generally considered to make quantization noise imperceptible to the human viewer. The reader is referred to M. F. Cowlishaw's paper "Fundamental Requirements of Picture Presentation" appearing on pages 101–107 of PROCEEDINGS OF THE SID, Vol. 26/2, 1985, for a comprehensive treatment of coding additive primary colors in differing numbers of bits.

One may analyze each color pixel as the sum of a luminance-only primary color and two chrominance-only primary colors. The luminance-only primary represents whiteness or brightness of the pixel. The chrominance-only primaries do not correspond with any real color, but together are representative of the difference of any real color from the luminance-only primary. Analyzing pixels in terms of luminance and two color-difference signals is usually done so that one may encode the two color-difference signals in less bandwidth than luminance. In digital sampled-data terms this usually corresponds to chrominance being sampled in image space at a subsampled rate compared to luminance being sampled in image space. Subsampling may be in the direction of line advance as well as in the direction in which scan lines extend.

A small computer may be used to decode television display martertial that has been encoded in an economical format (e.g., to permit the transmission of image data via telephone lines or the recording of image data on compact disc). This small computer may be provided with general-purpose memory, portions of which are available for use as image memory to provide buffering between an irregular flow of received image data and the regular flow of image data to the display. It is desirable to provide an image memory configuration that is well suited to being used interchangeably with other data storage in general-purpose memory and does not require the use of dedicated portions of the memory for image storage.

The encoding of television information for transmission over media of such limited bandwidths as those available from a telephone line or compact disc forces the designer to resort to powerful video compression methods These methods rely upon transmitting as little new image information per frame as possible and upon storing as much old image information as possible; and transmission of new image information cannot be done, at least not entirely, in real time. In order to write a display in real time, then, it is essential then to have frame buffer storage memory with the capability of storing at least two frames of video information. Such memory can be written to from a flow of compressed image data received in non-real time and read from so as to supply the display apparatus with a regular flow of image data in real time. The frames of stored information are updated on one frame and used to support display on the next, in staggered phasing. The frame buffer storage memory is bit-map-organized for convenience in constructing updated images from previous image data in accordance with instructions included in the compressed video data.

Image memories, the addressable storage locations of which map corresponding picture elements or "pixels" on a display screen and which store single bits descriptive of whether those corresponding pixels are bright or dark, have been described as being "bit-map-organized" for many years. In recent years the term "bit-map-organized" has been applied to certain image memories in which a pixel variable related to brightness is not expressed in terms of a single bit, but rather in terms of a plurality of bits. Such brightness-related variables may be luminance variables or may be color-difference variables used in connection with describing color displays, for example; or they may be component color variables, as another example. The term "bit-map-organized" has been extended to refer to two different memory configurations, each storing a plural-bit value descriptive of a pixel variable.

A plural-bit-variable bit-map-organized image memory of a first general type known in the prior art can be thought of as employing a number of planes, which number equals the total number of bits in the plural-bit-variable(s) describing a single pixel. The most significant bits of a first of the pixel variables are stored in the first bit plane at storage locations having respective addresses mapping respective pixel locations in the display; the next most significant bits of the first pixel variable are stored in the second bit plane at storage locations having respective addresses mapping respective pixel locations in the display in a manner corresponding to the mapping of the storage locations in the first bit plane; and so forth, proceeding to less significant bits in the first pixel variable, then proceeding through the bits of each other pixel variable (if any) proceeding from most significant to least significant bit. Responsive to a single address this type of memory furnishes simultaneously the respective plural bits of all the pixel variables descriptive of a particular pixel. Essentially, the spatial positions of individual pixels in the display have a one-to-one correspondence with respective image memory addresses, in a spatial mapping. This spatial mapping is held together by the tracing of the display screen and scanning of image memory addresses each being done in accordance with a prescribed pattern of correspondence between these activities. As long as the pattern of correspondence between these activities is adhered to, the rate at which and order in which these activities are carried out do not affect the spatial mapping between the image memory addresses and the spatial positions of display pixels.

A second general type of plural-bit-variable bit-map-organized image memory known to the prior art does not require a one-to-one correspondence between image memory address and the spatial positions of display pixels. There is a list of the values of the plural-bit pixel variables in a prescribed cyclic order, which cycles are arranged in the sequence of the tracing of the spatial positions of pixels in the display. The list is converted to a string of values of the pixel variables, with the bits in each value arranged in prescribed order according to relative significance. Each string of values is divided into words of given bit length, which words are stored respectively in successively addressed locations in the image memory. An image memory of this second general type has to be read out to a formatter with pixel unwrapping capability. The formatter reconstitutes the words into a string of values which are then parsed back into successive values of each pixel variable. The variables for each pixel are temporally aligned by the formatter to be available at the time the spatial position of that pixel is reached in the scanning of the display screen.

When a pixel is described in terms of plural variables—e.g., three primary color variables, or a luminance variable and two chrominance variables—it has been a general practice to group these variables in a prescribed order for each pixel and to use each group as subvariable components of a respective value of a complex pixel-descriptive variable. The values of this complex variable are then stored in a bit-map-organized image memory organized as either the first or the second type of image memory described above. This practice is reasonably satisfactory as long as the pixel-descriptive variables used as subvariable components of the complex variable are sampled at corresponding points in display space and with the same sampling density. However, it is desirable to be able to sample the pixel variables at differing sampling densities. This is primarily so that compressed video data can be more efficiently coded, but image memory is also conserved and image processing involves less calculation. If the pixel variables have different sampling densities in image space, using complex pixel-descriptive variables becomes unattractive.

A type of dual-ported, dynamic random-access memory that has recently become commercially available is the so called "video random-access memory" or "VRAM". This dynamic memory, in addition to a random-access input/output port through which information can be written into or read out of the memory, has a serial-access port from which a row of data can be read serially at video scan rates. The row busses of a principal dynamic random-access memory portion of a VRAM are arranged to transfer data in parallel to a smaller auxiliary memory of the VRAM, during an interval equal to the read interval from the random-access port. A counter is provided in each VRAM for scanning the addresses of the auxiliary memory during its reading, so the auxiliary memory can function as a shift register. After parallel loading of the auxiliary memory, its contents are read out serially through the VRAM serial output port, with the counter counting at a relatively high clock rate. This clock rate can be the rate at which the luminance-only picture elements are delivered to the display monitor of the computer apparatus, for example. This speed of reading is possible because the capacitance-to-substrate of the auxiliary memory busses is relatively low owing to the smaller size of this auxiliary memory.

In some types of VRAM, data can also be serially read into the auxiliary memory via the serial-access port, to be transferred in parallel into the principal dynamic random-access portion of the VRAM. This allows faster writing of the VRAM than is possible by writing information via its random-access port.

D. L. Sprague, N. J. Fedele and L. D. Ryan in their U.S. patent application Ser. No. 918,275 entitled "IMAGE STORAGE USING SEPARATELY SCANNED LUMINANCE AND CHROMINANCE VARIABLES", filed Oct. 14, 1986, and assigned to RCA Corporation, point out that time interleaving of lines of digitized chrominance information with lines of digitized luminance information is usefully applied to the reading of VRAM through its serial access port. Such practice facilitates the use of separate bit-map organizations of the second general type for luminance and chrominance variables in VRAM. The use of separate bit-map organizations for luminance and chrominance variables, Sprague et alii perceived, avoids the problems encountered in the use of complex pixel-descriptive variables in a unified bit-map organization when chrominance is sampled less densely in display space than luminance is. Sprague et alii describe in detail how to linearly pack image memory into VRAM, when separate bit-map organizations for luminance and chrominance variables are used. The use of separate bit-map organizations can be accommodated by using a rate-buffering memory for at least the chrominance samples, Sprague et alii realized. They used the rate-buffering memory for a further purpose to provide the sample bed information to support spatial interpolation in the direction transverse to line scan.

The coding of pixel information in terms of wideband luminance and two narrowband chrominance variables can reduce by nearly three times the bandwidth in terms of bits per unit time needed to linearly code image data, assuming these variables are sampled with the same numbers of bits, as Sprague et alii observed. This saves bandwidth in the compressed video data supplied to the computer and reduces the amount of computer memory needed for storing image data. However, there are problems with thus coding pixels in memory.

Coding pixel information in terms of luminance and chrominance is inefficient in terms of providing optimal resolution in luminance for given pixel code lengths. Amplitude resolution is needed more in luminance components of the drive signals to the display device than in color-difference components of the drive signals insofar as keeping the human observer unaware of quantizing noise is concerned. When the display color is white or shades thereof, the chrominance variables are non-contributory to the display. The resolution in luminance is defined just by the number of available bit places in the luminance variable alone, when pixel colors are defined in terms of luminance and chrominance variables.

Contrast this with the coding of color pixels in red (R), green (G) and blue (B) variables. If red and blue have the same number of bits defining their ranges of variation as green does, the resolution in luminance amplitude is determined by the number of bit places in green, the most significant component of luminance, divided by the fraction of luminance that is green. This fraction is customarily about 0.59. Eight bits in luminance can define 256 levels therein; 7 bits, 128 levels. Eight bits in green can define 434 levels approximately in luminance; seven bits in green can define 217 levels approximately in luminance; six bits in green can define 108 levels approximately in luminance. This advantage in luminance resolution still obtains when the number of bit places in red and in blue is reduced relative to the number of bit places in green, towards the number of bit places in the primary color being in proportion to the logarithm-base-two of their respective contributions to luminance, as advocated by Cowlishaw.

The I, Q or (R-Y), (B-Y) chrominance variables and Y luminance variable, used by Sprague et alii are not independent variables, as the additive color primaries red, green and blue are. Y and either pair of chrominance variables define a color space almost five times larger than that which is reproducible using the limited-brightness red, green and blue phosphors of a color kinescope. So, for a given pixel code length, one cannot define as finely that portion of color space in which physically realizable colors are located using the dependent variables, as one can using the additive color primaries. Further, the bit-compression of red, green and blue as independent variables towards greater equality of their respective contributions to luminance quantizing noise, as advocated by Cowlishaw, does not result in shortened bit-lengths for luminance and color-difference dependent variables. So the image data compression scheme employed by Sprague et alii in U.S. patent application Ser. No. 918,275 could not exploit the scheme of image data compression advocated by Cowlishaw.

(The concern with regard to efficiency in image coding arises primarily from the desire to implement video compression in the digital data supplied to the drawing processor of the computer, one should understand. Usually all calculations in the drawing processor take place at a rate determined by the time needed to process the pixel variable with most bits of amplitude resolution. If calculations are made concerning a pixel variable with fewer bits amplitude resolution, it is customary to pad the variable with added ZEROs. This is the easiest procedure when image calculations are carried out separately and serially on component portions of the image data. When image calculations are carried out separately and parallelly on component portions of the image data, padding variables to equal bit length is still the easiest procedure, since the calculating hardware may be simply replicated and then operated synchronously. Efficient image coding can allow denser packing of image memory, but the formatter following image memory must have a more sophisticated pixel unwrapping capability if dissimilar bit lengths are used in the various pixel variables. Especially as the cost of computer memory per bit falls with progress in the art of making random-access memory, it may be preferred to pad the pixel variables stored in image memory to even bit-lengths, where their bit lengths differ by only one or two bits, in order to simplify timing and formatting problems.)

It is more difficult to take into account the effects of inaccuracies in image calculations, as introduced by truncation and round-off, when one uses dependent variables in the calculations rather than the additive primaries. The dependent variables tend to be signed quantities, so the offsets introduced to make them always positive for purposes of calculation enter the multiplicative processes associated with the manipulation of pixels in space. The offsets can affect less significant bits of product terms, thereby to complicate truncation or round-off procedures. The tendency of successive errors in calcuation to be self-compensating, rather than cumulative in effect, is adversely affected by calculating in terms other than the additive primaries.

It is pointed out that knowledge gained from the designing of camera for broadcast color television provides a clue concerning how to advance the art with regard to the types of frame storage memory Sprague et alii indicate are to be favored for computer graphics—i.e., those that store component parts of color images in separately bit-map-organized portions of memory. In broadcast color television some cameras use three camera tubes which are respectively red-responsive, green-responsive and blue-responsive. The spatial registration of the three camera tubes is difficult to maintain with sufficient accuracy for all portions of the image such that a luminance signal formed from additively combining the responses of the three camera tubes in theoretically correct proportions will be accurate in the higher frequencies. The displacement among the three different color images in the camera tube responses causes their high frequency responses to fail to overlap in portions of the image. So, manufacturers of these color television cameras use the high-frequency response of only one of the camera tubes instead of the combined high-frequency responses of the camera tubes to define high-frequency luminance signal. Usually the high-frequency response of the green camera tube is chosen for this purpose, since green is the largest component of luminosity insofar as the human eye is concerned. Narrowband responses to the camera tube output signals so obtained by low-pass filtering are algebraically combined to obtain narrowband Y, I and Q signals—or, alternatively, narrowband Y, (R-Y) and (B-Y) signals-—and the high frequency response from the one camera tube is added to the narrowband Y signal to define a wideband Y signal.

The present invention is based upon the reasoning that one can combine in other ways the four basic pieces of image information, namely, the narrowband red signal, the narrowband green signal, the narrowband blue signal, and the detail signal in a spatial-frequency band above the lower-spatial-frequency baseband shared by the three narrowband color signals. The detail signal can be admixed with one of the narrowband color signals to create a wideband signal which together with the other two narrowband color signals will contain the image information a human observer uses. In the display apparatus the detail signal can be extracted from the wideband signal by high-pass spatial filtering. The extracted detail signal can be used to adjust the high-spatia-frequency content of the wideband signal, if this is necessary. The extracted detail signal is also admixed with the two narrowband color signals in proportion with the contributions of their respective colors to luminance, thereby to form additional wideband color signals. The three wideband color signals are then used to display the original image in a mixed-highs presentation.

The wideband signal containing detail information may simply be a wideband green signal, for example. This can support a mixed-highs presentation on a display monitor with color kinescope that is similar to that generated from Y, I, Q supplied from a three-camera-tube television camera tube. This is known to be commercially acceptable.

As another example, the wideband signalcontaining detail information may be a narrowband green signal added together with luminance detail formed in response to red, green and blue portions of image. If this is done, it is convenient to reduce the luminance detail in proportion to the contribution made thereto by the green component of luminance. This avoids the need for having to adjust detail level in the wideband signal in order to make it an appropriate green drive signal for the kinescope. Luminance detail is afforded somewhat less amplitude resolution than lower-spatial-frequency luminance when this is done. Seven bit resolution for narrowband green allows 217 levels for low-spatial-frequency luminance, as noted previously. However, only 0.59 times the 128 levels afforded by seven bit resolution are available for high-spatial-frequency luminance coded together with narrowband green. This is about 75 levels of luminance detail resolution.

The literature indicates that 32 levels of luminance detail resolution in linearly coded video is all that is needed to support displays that the human viewer cannot distinguish from broadcast-quality television displays. The reader is directed to the paper by D. E. Troxel et alii entitled "A TWO-CHANNEL PICTURE CODING SYSTEM: I - REAL TIME IMPLEMENTATION", which appeared on pages 1841–1848 of *IEEE TRANSACTIONS ON COMMUNICATIONS*, Vol. COM-24, No. 12, December 1981. They indicate five bits per sample can linearly code luminance highs so pictures reconstructed from digitized samples are indistinguishable from broadcast-quality originals irrespective of viewing distance. If viewing distance is at least four times picture height, four bits can suffice.

SUMMARY OF THE INVENTION

The present invention is embodied in a principal one of its aspects in frame storage memory, wherein narrowband portions of the image of one additive primary color are stored together with higher-spatial-frequency detail information in a portion of memory the adressed storage locations of which fully sample image space, and wherein narrowband portions of the image of the other two primary colors are stored in a portion of the image memory the addressed storage locations of which subsample image space.

BRIEF DESCRIPTION OF THE DRAWING

FIGS. 8–13 are diagrams of how VRAM rows can be packed with image data in accordance with the invention.

DESCRIPTION OF THE PREFERRED EMBODIMENT

Figure 1:
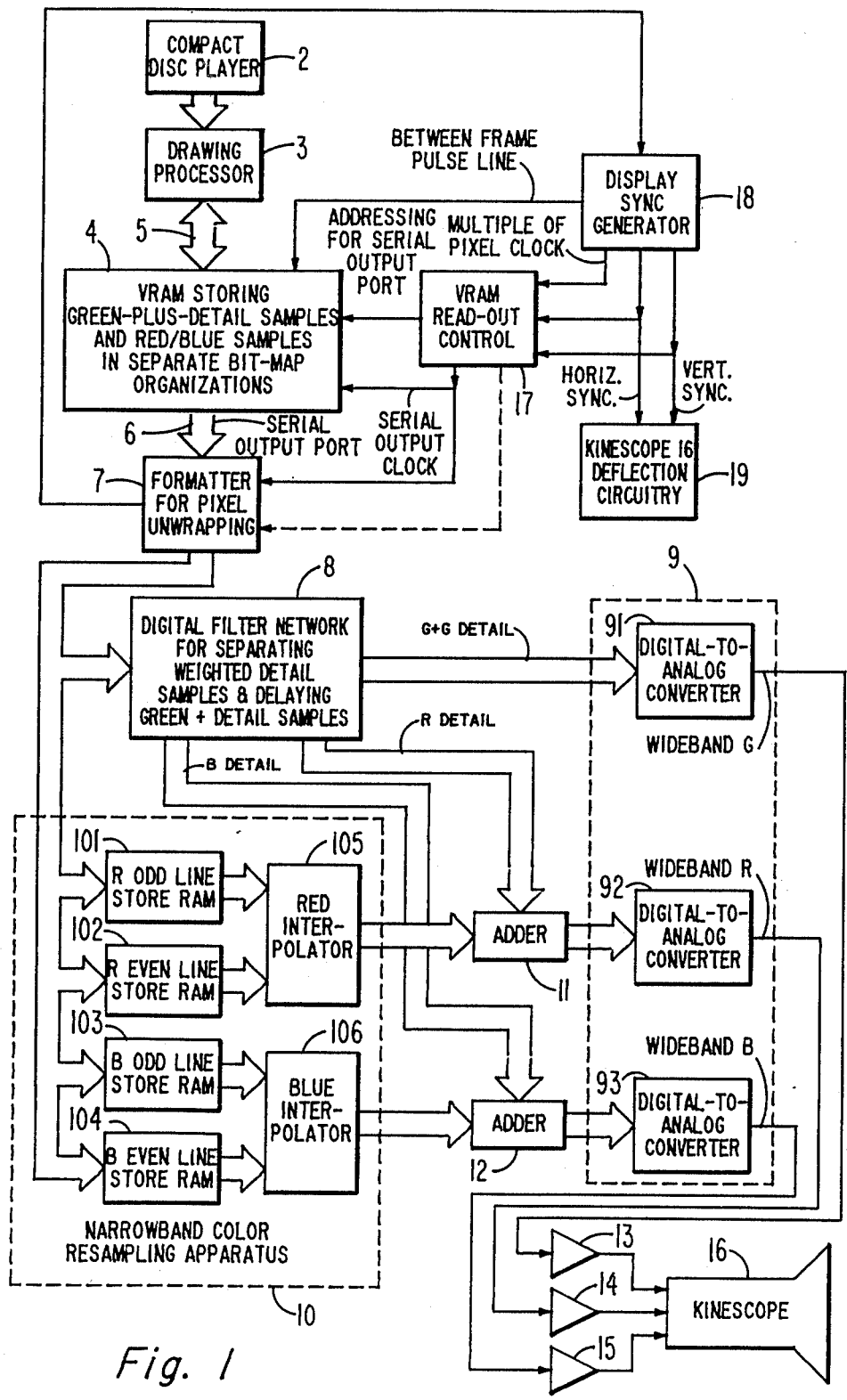
FIG. 1 is a schematic diagram of a television display system which includes narrowband color resampling apparatus and embodies the invention.

FIG. 1 shows a television display system which converts television imagery, stored in compressed form on a compact disc, to a real-time display. A compact disc player 2 supplies the television imagery in coded form to a drawing processor 3. (Another data source, such as a Winchester disc, may be used instead of compact disc player 2.) The imagery coding is designed to describe differences of a current image from recent images already reconstructed and stored in the image memory portions of a video random-access memory (or VRAM) 4, to lessen redundancy in the imagery coding. (VRAM 4, as will be explained in detail further on, is in actuality a banked array of component monolithic VRAMs.) Drawing processor 3 has a bus connection to the read/write random-access port of VRAM 4 and to VRAM 4 control circuitry that allows drawing processor 3 to read out to itself any of the images stored in VRAM 4 and that allows drawing processor 3 to write a current or updated image into the image memory portion of VRAM 4. VRAM 4, in addition to its random-access input/output port, has a serial output port from which a row of data can be read serially at video rates.

The nature of the stored images in VRAM 4 is of particular concern to the invention. The image memory portions of VRAM 4 are separatey bit-map-organized with respect to red/blue samples descriptive of red and blue portions of display images and with respect to green/detail samples descriptive of green and high-spatial-frequency portions of display images. In a bit-map organization of image memory, the storage locations in memory conformally map descriptions of the picture elements, or "pixels", of the display subsequently constructed from the read-out of that image memory detail. One can arrange to bit-map pixels so red, green and blue samples are combined at each storage location in image memory. However, where higher-spatial-frequency detail information is included with green samples the green/detail samples that result are more densely packed in image space than are red and blue samples. Furthermore, sometimes the ratio of the sampling densities in space of green/detail samples and of red and blue samples is subject to variation. To include red and blue samples together with only selected green/detail samples in a single bit-map organization would tend to result in underutilization of memory at such times. This is because, practicaly speaking, each storage location would have to have the capability of storing red and blue information whether or not it was actually available for that point in the bit-map.

This problem can be avoided (in a variant of the Sprague et alii teaching) by using densely-sampled-inspace bit-map organization for green/detail samples in one portion of image memory and using a separate sparsely-sampled-in-space bit-map organization for red and blue samples in another portion of image memory. It is convenient to make the sparser spatial sampling a subsampling of the denser spatial sampling. Where the ratio of the spatial sampling densities varies, there is a change in the apportionment of image memory between the green/detail samples and the red and blue samples.

During line trace intervals in the display, lines of green/detail samples from the more densely sampled bit-map-organized portions of image memory that have been loaded in parallel into the VRAM 4 auxiliary memory are read out serially through the serial output port 6 of VRAM 4 to a formatter 7. Formatter 7 performs "pixel-unwrapping" functions to furnish pixel data concerning either green/detail, or red and blue. The way formatter 7 operates will be described in more detail further on. During line trace intervals formatter 7 re-times the green/detail samples (supposing them to have been "linearly packed" in VRAM 4, as will be described in greater detail further on) so they are supplied at pixel scan rate to a digital filter network 8. Filter network 8 contains a two-dimensional high-pass spatial filter which extracts detail samples from the green/detail samples. These detail samples are suitably weighted in filter network 8, so as to generate a red detail signal and to generate a blue detail signal. Filter network 8 also delays the green/detail samples to maintain their temporal alignment with red detail and blue detail samples concerning the same picture elements.

During selected line retrace intervals in the display, lines red (R) of samples and of blue (B) samples from the less densely sampled bit-map-organized portions of image memory are selected for read out from VRAM 4 via serial access output port 6 to formatter 7. One way to do this is to read out two lines of samples during each selected line retrace interval, one being a line of red samples and the other being a line of blue samples. This permits separate bit-map organizations for red and for blue, which simplifies the drawing processor 3 required for converting coded imagery from compact disc player 3 to bit-map organization image data in VRAM 4. Simplification arises because calculations involving red and blue can be performed separately and serially, such calculations being made with simpler interfacing between drawing processor 3 and VRAM 4. The time-division-multiplexing of formatter 7 output signals to filter network 8 and to a narrowband color resampling apparatus 10 during display processing is also simplified, since the multiplexing rate during line retrace intervals is low.

Alternatively, one may stagger the lines of red samples and the lines of blue samples in image space rather than superposing lines of red samples on lines of blue samples. This allows the lines of red samples to be read from VRAM 4 in line retrace intervals staggered in time with respect to the line retrace intervals in which lines of blue samples are red from VRAM 4. It is also possible to arrange to read half lines of red samples from VRAM 4 in respective pairs of line retrace intervals flanking each of the line trace intervals in which all lines of red samples is used without interpolation in the vertical direction, and to read out half lines of blue samples from VRAM 4 in respective pairs of line retrace intervals flanking each of the line trace intervals in which a line of blue samples is used without interpolation in the vertical direction.

Formatter 7 performs further pixel-unwrapping functions, in separating successive red and blue samples and supplying separate bit streams of red samples and of blue samples to the narrowband color resampling apparatus 10. If VRAM image memory is read out in the preferred way, a bit stream of red samples is supplied to resampling apparatus 10 during one portion of line retrace interval and a stream of blue samples is supplied to resampling apparatus 10 during another portion of line retrace interval. The re-sampling apparatus 10 re-samples the digitized red and blue variables to the same sampling density as the digitized green/detail variables.

The fully sampled narrowband red signal from interpolator 105 and the red detail signal from the digital filter network 8 are summed in a digital adder 11 to generate a digital wideband red signal. The fully sampled narrowband blue signal from interpolator 106 and the blue detail signal from the digital filter network 8 are summed in a digital adder 12 to generate a digital wideband blue signal. The narrowband green plus detail, or digital wideband green signal, from digital filter network 8 is supplied to digital-to-analog conversion circuitry 9, as are the digital wideband red signal from adder 11 and the digital wideband blue signal from adder 12.

Digital-to-analog conversion circuitry 9 is shown in FIG. 1 as being of the type comprising respective digital-to-analog converters 91, 92 and 93 for the digital wideband green, red and blue signals. Other arrangements using multiplexing and fewer converters can be used instead, as will be understood by those of skill in the art. In any case, responsive to the digital wideband red, green and blue signals digital-to-analog conversion circuitry 9 supplies red (R), green (G) and blue (B) drive signals that are analog in nature. These R, G and B drive signals are amplified by video amplifiers 13, 14 and 15 respectively. The amplified drive signals are then applied to kinescope 16 to generate the color display.

Still referring to FIG. 1, a display synchronizing generator 18 generates HORIZONTAL SYNCHRONIZATION and VERTICAL SYNCHRONIZATION pulses for application to the deflection circuitry 19 of kinescope 16. Display synchronizing generator 18 also supplies signals to VRAM read-out control circuitry 17 to inform it concerning display timing. For example, VRAM read-out control circuitry 17 includes a line counter for counting HORIZONTAL SYNCHRONIZATION pulses supplied from display synchronizing generator 18. This line counter is reset to zero by a BETWEEN FRAME pulse supplied by display synchronizing generator 18 after the conclusion of each frame of display and before the start of the next. Display sync generator 18 also supplies pulses at a multiple of the pixel scan rate to control circuitry 17.

Circuitry 17 scales from these pulses to generate an appropriate SERIAL OUTPUT CLOCK signal for application to VRAM 4 and to formatter 7. The formatter 7 allows data to be taken out "full width" from the serial output port 6 of VRAM 4, so the clock rate at which data is clocked from port 6 can be kept to a minimum. For example, if port 6 is thirty-two bits wide, then during the line trace interval, each 32-bit word read out through port 6 can be apportioned into four successive eight-bit green/detail samples by formatter 7, permitting the VRAM output to be scanned somewhat slower than one-quarter the pixel scan rate. Formatter 7 does this formatting responsive to instructions from control circuitry 17. Control circuitry 17 also selects the rows in VRAM 4 to be transferred in parallel to the VRAM 4 shift register shifting its contents out through serial-access output port 6. VRAM read-out control circuitry 17 also applies the correct SERIAL OUTPUT CLOCK signal to this shift register for this shifting procedure.

Continuing the example, suppose the red and blue samples are all eight-bit samples and are spatially subsampled every fourth green/detail sample in every fourth line of green/detail samples. During a selected line retrace interval, conventionally one fifth as long in duration as a line trace interval, the number of samples in red and the number of samples in blue each is one-quarter the number of samples of the green/detail signal during a line trace. Each thirty-two-bit word read out through port 6 during a line retrace interval is apportioned into four successive eight-bit red samples or four successive eight-bit blue samples, for application to resampling apparatus 10. Since the number of samples of red per one of its scan lines and the number of samples of blue per one of its scan lines are each one-quarter the number of samples of green/detail per one of its scan lines, the total number of samples of red and blue per pair of their successive scan lines is one half the number of green/detail samples per one of its scan lines. Since the total number of samples of red and blue per pair of their scan lines is to be transferred from VRAM 4 serial output port 6 in a line retrace interval one fifth the duration of the line trace interval in which green/detail samples are displayed, VRAM read out control circuitry 17 has to increase the SERIAL OUTPUT CLOCK rate during line retrace by a factor of at least $2\frac{1}{2}$ times.

If clock rates are scaled only by powers of two from a high rate master clock signal, the serial clock rate used to read from VRAM 4 during line retrace interval will be four times the full pixel scan rate for green/detail. This reduces the time needed for accessing VRAM 4 for obtaining red and blue samples to less than a complete line retrace interval, freeing output port 6 for downloading other data during the remaining portion of the line retrace interval.

The resampling apparatus 10 includes line-storage random-access memories 101, 102, 103 and 104. A selected pair of these line-storage memories are written responsive to red samples and blue samples supplied to them from formatter 7 during selected line retrace intervals. Line-storage memories 101 and 102 are written alternately by successively selected lines of red samples, and memories 101 and 102 are read out during line trace intervals to supply adjacent lines of red samples in parallel to a two-dimensional spatial interpolator 105. Line-storage memories 103 and 104 are written alternately by successively selected lines of blue samples. Memories 103 and 104 are read out during line trace intervals to supply adjacent lines of blue samples in parallel to a two-dimensional spatial interpolator 106. Interpolators 105 and 106 supply resampled red and blue signals to the digital-to-analog converters 11 and 12, respectively. Red and blue signals are each resampled to the same spatial sampling density as green/detail signal.

Figure 2:
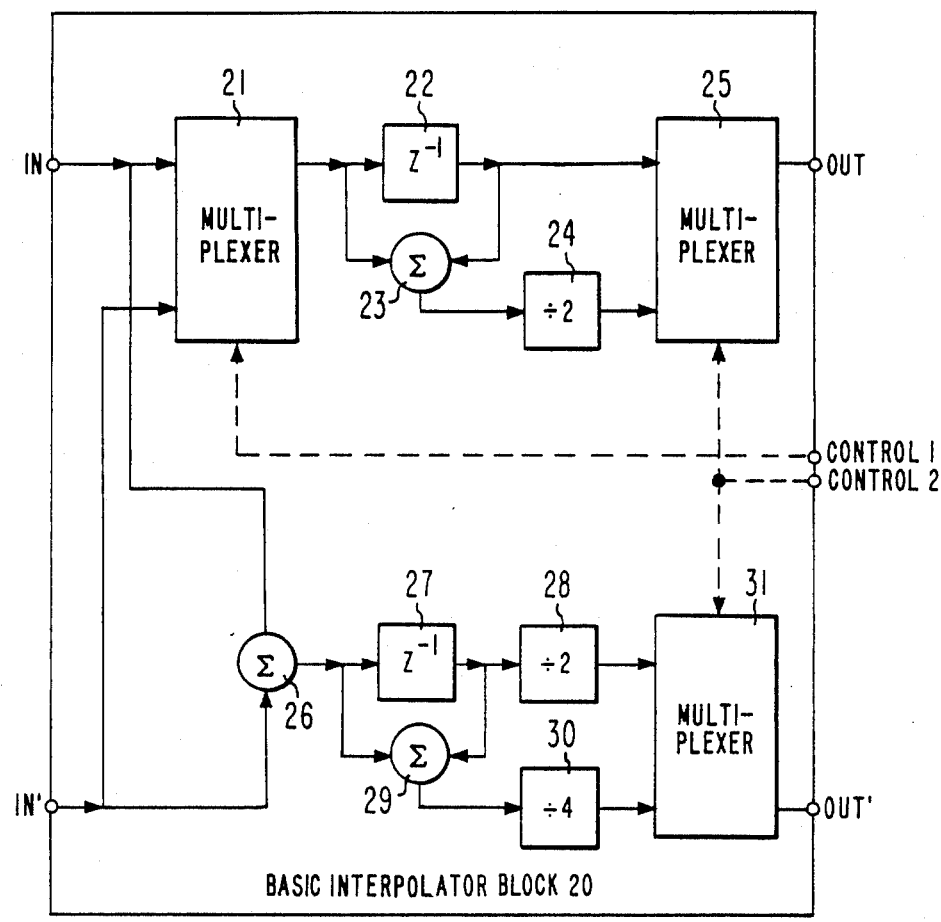
FIG. 2 is a schematic diagram of a basic interpolator block, used as a building block in interpolators that may be used in implementing the FIG. 1 television display system.

FIG. 2 shows a basic interpolator block 20 described by Sprague et alii that can be used as a basis for the construction of each of the interpolators 105 and 106, to provide for each of them being bilinear interpolators. The output pixel scan rate from the block 20 is double the input pixel scan rate to its input terminals IN and IN'. Respective streams of pixel samples from adjacent scan lines in subsampled image space are repetitively supplied at output scan line rate to terminals IN and IN' of interpolator block 20. Each scan line in subsampled image space is repeated either $2^{(n+1)}$ times, or one less time, where $2^n:1$ spatial interpolation is performed in the direction transverse to scan lines, n being a positive integer at least unity. Repeating the scan lines $2^{(n+1)}$ times simplifies the clocking of the line store RAMs 101–104. In either case, the line store RAMs 101–104 can be loaded during two successive line retrace intervals, rather than just one.

A multiplexer 21 responds to a CONTROL 1 signal to select the one of the streams of pixels applied to terminal IN and IN' for spatial interpolation that is earlier-in-time in the direction of line scanning. As a first step in this interpolation the selected stream of pixels is applied to a one-pixel-delay circuit 22. The pixels from the selected stream are summed in an adder 23 with the pixels from the selected stream as delayed one pixel by circuit 22, and the resultant sum is divided by two in a bit-place shifter 24 to supply the average of two successive pixels in the stream selected by multiplexer 21. A multiplexer 25 alternately selects to the terminal OUT of interpolator block 20 the delayed pixel output of circuit 22 and that average of two successive pixels. This selection by multiplexer 25 is made at the pixel output rate that is twice the pixel input rate.

Terminal OUT' of interpolator block 20 supplies another stream of pixels at this pixel output rate, representative of an interpolated scan line preceding the scan line supplied through terminal OUT. This interpolated scan line is generated as follows. The streams of pixels supplied to terminals IN and IN' of interpolator block 20 are summed in an adder 26 and applied to a one-pixel-delay circuit 27. The output of circuit 27 is divided by two by a one-bit-place shifter 28 to supply pixels for the interpolated scan line which are interpolated only in the direction transverse to the scan line direction. Pixels for the interpolated scan line which are also interpolated in the direction of the scan line are generated by (1) summing in an adder 29, the adder 26 output and the adder 26 output as delayed one pixel in circuit 27 and (2) dividing the resultant sum from adder 29 by four in a two-bit-place shifter 30. A multiplexer 31 alternately selects to terminal OUT' of interpolator block 20 the pixels for the interpolated line scan that are not interpolated in the direction of line scan and those pixels that are. This selection by multiplexer 31 is made at the pixel output rate, which is twice the pixel input rate.

Interpolator block 20 resamples its input data as supplied to terminals IN and IN' to provide at its terminals OUT and OUT' samples at 4:1 higher scan rate. However, these samples are not in regular scan line order.

Figure 3:
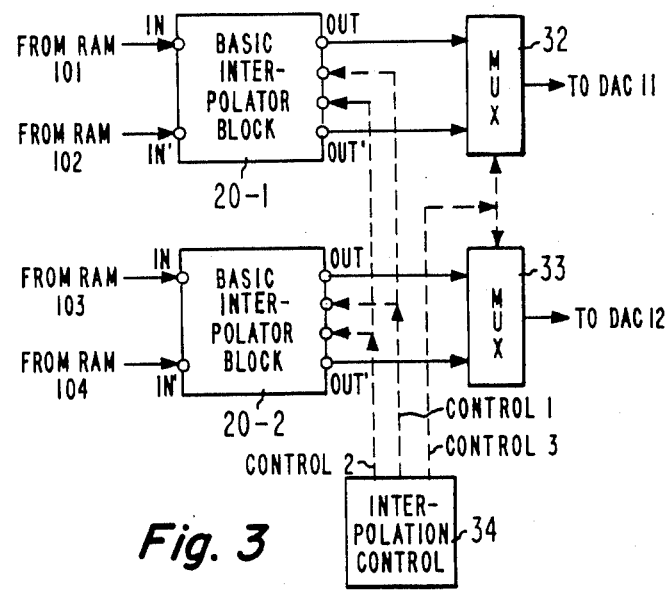
FIGS. 3 and 4 are schematic diagrams of two interpolators, each constructed using one or more FIG. 2 basic interpolator blocks, and each applicable for use in the FIG. 1 television display system.

FIG. 3 shows how Sprague et alii indicated interpolators 105 and 106 of FIG. 1 might be constructed using two basic interpolator blocks 20-1 and 20-2 together with multiplexers 32 and 33, when 2:1 spatial interpolation is desired both in the direction of scan line extension and in the direction transverse to the scan lines. Multiplexers 32 and 33 operate to place the higher scan rate red and blue samples in regular scan line order. Line storage RAMs 101, 102, 103 and 104 are each read four (or three) times before being re-written. When interpolators 105 and 106 are constructed per FIG. 3, RAMs 101 and 103 are written simultaneously, and RAMs 102 and 104 are written simultaneously. There is a two-scan-line offset between the writing of RAMs 101 and 103 and the writing of RAMs 102 and 104, when the interpolators 105 and 106 are constructed per FIG. 3.

Interpolation control circuitry 34 supplies CONTROL 1 signal at the input line advance rate to both the basic interpolator blocks 20-1 and 20-2. Circuitry 34 also supplies them both with the CONTROL 2 signal at twice the input scan rate (which in the FIG. 3 interpolators equals the output pixel scan rate). Circuitry 34 further supplies a CONTROL 3 signal switching at input line advance rate to each of the multiplexers 32 and 33. Multiplexers 32 and 33 provide input data for digital-to-analog converters 11 and 12 by selecting the two interpolated signals from the terminals OUT' of blocks 20-1 and 20-2 respectively during one set of alternate output lines. During the intervening set of alternate output lines, multiplexers 32 and 33 provide input data for converters 11 and 12 by selecting the two interpolated scan lines from the terminals OUT of blocks 20-1 and 20-2 respectively. Multiplexer 32 arranges the output scan lines of red in correct sequential order, compensating against the reversals of scanning line order in line-storage RAMs 101 and 102 accepted in order to reduce the frequency of their re-writing. In like manner multiplexer 33 arranges the output scan lines of blue in correct sequential order, compensating against the reversals of scanning line order in line-storage RAMs 103 and 104. Cascade connections of pluralities n in number of basic interpolator blocks replacing the single basic interpolator blocks 20-1 and 20-2 can be used to implement $2^n:1$ spatial interpolation both in the direction of scan line extension and in the direction transverse to scan lines.

Figure 4:
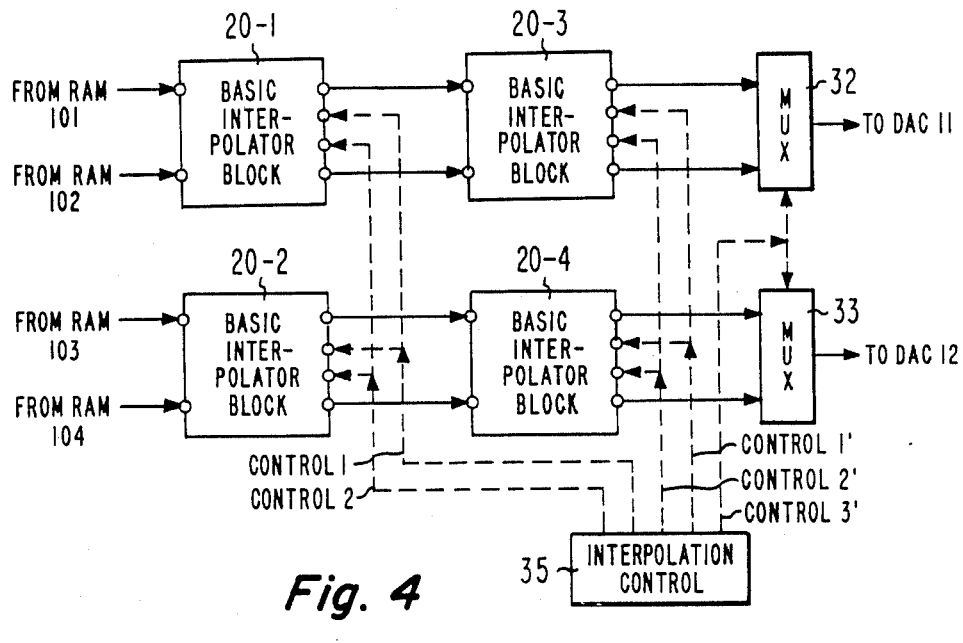

FIG. 4 shows how interpolators 105 and 106 can be constructed to provide 4:1 spatial interpolation in each of these directions, following the description of Sprague et alii Basic interpolator block 20-1 is followed in cascade connection by another basic interpolator block 20-3 and multiplexer 32 in this embodiment of interpolator 105. Basic interpolator block 20-2 is followed in cascade connection by another basic interpolator block 20-4 and multiplexer 33 in this embodiment of interpolator 106. Line storage RAMs 101, 102, 103 and 104 are each read eight (or seven) times before being re-written when interpolators 105 and 106 are constructed per FIG. 4. RAMs 101 and 103 are written simultaneously, and RAMs 102 and 104 are written simultaneously. There is a four-scan-line offset between the writing of RAMs 101 and 103 and the writing of RAMs 102 and 104, when the interpolators 105 and 106 are constructed per FIG. 4.

Interpolation control circuitry 35 supplies the CONTROL 1 signal to both the blocks 20-1 and 20-2 at one half their output line advance rate. Interpolation control circuitry 35 also supplies the CONTROL 2 signal at twice the pixel scan rate from line-storage RAMs 101-104 to both of the blocks 20-1 and 20-2. In the FIG. 4 interpolators this rate equals one-half the output pixel scan rate. Interpolation control circuitry 35 also supplies the CONTROL 3 signal switching at the input line advance rate to multiplexers 32 and 33. As in the FIG. 3 interpolation circuitry, multiplexers 32 and 33 compensate for line scanning order reversals in line-storage RAMs 101-104.

Basic interpolator blocks 20-1 and 20-2 supply, to basic interpolator blocks 20-3 and 20-4 in cascade after them, twice as many input scan lines as they received from the line storage RAMs 101-104. Accordingly, interpolation control circuitry 35 supplies a CONTROL 1' signal to the CONTROL 1 signal connections of basic interpolator blocks 20-3 and 20-4 at one half their output line advance rate—that is, at the output line advance rate of basic interpolator blocks 20-1 and 20-2.

Basic interpolator blocks 20-3 and 20-4 receive pixels from basic interpolator blocks 20-1 and 20-2 at twice the pixel scan rate from line-storage RAMs 101-104. Interpolation control circuitry 35 supplies a CONTROL 2' signal to the CONTROL 1 signal connections of basic interpolator blocks 20-3 and 20-4 at the twice their pixel input rate, which is four times the pixel output rate from line-storage RAMs 101-104.

Figure 5:
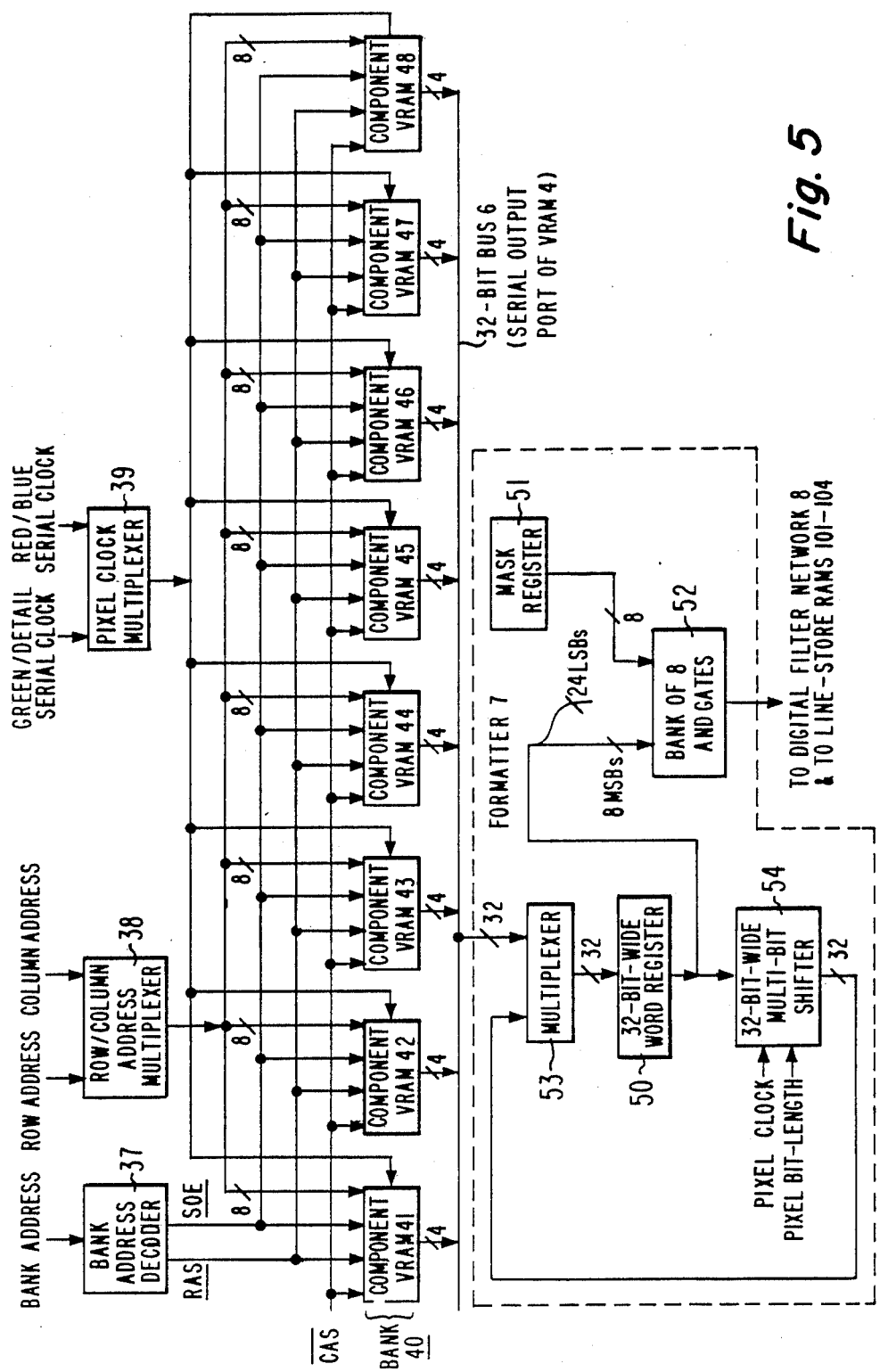
FIG. 5 is a schematic diagram of video random-access memory architecture used in the FIG. 1 television display system.

FIG. 5 is offered as an aid to understand more completely how the green/detail information can be stored in separate bit-map organization from red and blue information. FIG. 5 shows more particularly the construction of one bank of VRAM 4 and of a formatter 7 which performs the pixel-unwrapping function. VRAM 4 comprises at least one bank 40 of component VRAMs. Each bank 40 is shown as comprising eight VRAMs 41-48, making the VRAM serial output port bus 6 thirty-two bits wide, a conventional width. The formatter 7 shown in FIG. 5 is relatively unsophisticated in its pixel unwrapping capability, being able to parse VRAM 4 serial output only into pixel variables with bit lengths that are integral-power-of-two in nature. Seven-bit green variables, six-bit red variables and five-bit blue variables are padded to eight-bits in VRAM 4 when this type of formatter 7 is used. A more complex formatter 7 construction, within the scope of design for those skilled in the digital hardware art, will permit parsing the variables to exact bit length and will economize on the amount of VRAM 4 required for image memory. Where VRAM 4 is dedicated to image processing proceeding from compressed video data and is not called upon to do general data processing. Bank 40 may include only seven VRAMs 41-47 and a twenty-eight bit wide serial output port 6 used.

Sprague et alii indicate that it is preferable that the bit-maps are stored in VRAM 4 as if the following mapping procedure were followed. Each of the several-bit-pixel data is converted from parallel-bit to serial-bit format according to a prescribed ordering rule. The successive pixel data in each scan line are then strung together seriatim. The resulting strings of bits descriptive of a display scan line are then strung together in the order of display scan line advance, so the description of a complete image field is afforded by the resulting still longer string of bits. This string of bits is then mapped into successive rows of VRAM 4 in a procedure called "linear packing". Linear packing permits the density of storage in VRAM 4 to be as high as possible despite the bit-length of the pixel codes being chosen from a plurality of code lengths submultiple to the number of bits in a row of a VRAM 4 bank, such as bank 40. A commercially available component 64K×4 VRAM contains four square dynamic memory arrays $2^8$ bits on a side, it also contains static memory operable to provide four parallel-in/serial-out registers as buffer memory to four-bit wide serial output port. A bank of eight such component VRAMs provides 256 rows of 256 four-byte digital words, and these dimensions will be assumed by way of example for VRAM 4 throughout the remainder of this specification. Pixel variables will be padded to an integral-power-of-two number of bits, despite some inefficiency in image memory.

The loading of the static memories in the component VRAMs, which serve as buffer memories to the serial output port of VRAM 4, is controlled by a SERIAL READ-OUT ADDRESS CODE called SRAC for short. SRAC is a three part code consisting of a first group of adjacent bit places containing a BANK ADDRESS, a second group of adjacent bit places containing a ROW ADDRESS and a third group of adjacent bit places containing COLUMN ADDRESSES. The ROW ADDRESS and COLUMN ADDRESS portions of SRAC are descriptive of storage location placement in VRAM 4 and are not directly related to the dimensions of the display raster, the bit-map organization for luminance pixel codes or the bit-map organization for chrominance pixel codes. SRAC will be assumed to code BANK ADDRESS in its most significant places, which is preferable to do from the viewpoint of allowing easy add-on of more banks of component VRAMs. SRAC will be assumed to code COLUMN ADDRESS in the least significant group of eight bit places and to code ROW ADDRESS in the next least significant group of eight bit places. Each of the $2^m$ values of BANK ADDRESS is assigned solely to a respective bank of VRAM 4, and a bank address decoder 37 for that bank 40 of VRAM 4 to which the current value of those m bits is assigned responds to that value to condition bank 40 of VRAM 4 for reading out to the thirty-two bit wide data bus 6. This arrangement makes possible the multiplexed connection of the banks 40, etc. of VRAM 4 to bus 6.

The ROW ADDRESS portion of SRAC governs the choice of row to be loaded for the serial-access output port of at least the selected bank 40 of VRAM 4. Bank 40 (like the other banks of VRAM 4) comprises a respective octet of component VRAMs 41, 42, 43, 44, 45, 46, 47, 48 each having a four-bit-wide serial-access port. The number of bits in a row of VRAM 4 serial output is 256 columns times 32 bits per column, for a total of $2^{13}$ bits.

It is convenient to describe the green/detail, component signal of a display line in a number of bits related to the number of bits per row of VRAM 4 in integral-power-of-two ratio. This avoids the need for parallel transfer of row data in the VRAM 4 during line trace interval in order to continue supporting the serial flow of data through serial output port 6, while at the same time completely filling rows of VRAM with green/detail data. A display line of high-resolution green/detail component signal, for example, might comprise 1024 eight-bit pixels so it is in 1:1 ratio with a row in VRAM 4, in terms of numbers of bits. A display line of intermediate-resolution green/detail component signal might comprise 512 eight-bit pixels and is thus in a 1:2 ratio with a row in VRAM 4, in terms of numbers of bits. A display line of lower-resolution green/detail component signal might comprise 256 four-bit pixels so it is in a 1:8 ratio with a row of VRAM 4, in terms of numbers of bits. Four display lines of a red or blue component spatially subsampled 4:1 in both display-line-scan and display-line-advance directions relative to these green/detail component signals would respectively be in 1:16, 1:32 and 1:128 ratios with a row of VRAM 4, in terms of numbers of bits. This presumes red and blue are encoded in the same number of bits per sample as green/detail.

The COLUMN ADDRESS portion of SRAC specifies an offset in the counter-generated addresses for the static memories in component VRAMs 41–48 etc, during their reading. The static memories in each component VRAM are written in parallel from the associated dynamic memory in that component VRAM with zero-valued offset. The serial reading of the static memories through the serial output ports of the component VRAMs in the selected bank 40 of VRAM 4 begins at the column location specified by the COLUMN ADDRESS portion of SRAC. Where a plurality of display lines of information are stored in a VRAM 4 row, the COLUMN ADDRESS portion of SRAC permits the serial output from VRAM 4 to commence at the beginning of any one of the display lines of information.

Except when the number of bits in a display line equals or exceeds the number of bits per row in VRAM 4, the row of VRAM 4 transferred to the static memories in the component VRAMs 41–48 of the selected bank 40 generally will not be fully read out before those static memories are re-written. The underlying reason for this is that luminance pixel codes are read from VRAM 4 during line trace intervals through the same serial output port that chrominance pixel codes are read from VRAM 4 during line retrace intervals. This time-division-multiplexing between two bit-map organizations requires that the static memories be rewritten each time data from a different one of the two bit-map organizations is to be read out.

Any particular bank of VRAM 4 can be selected responsive to the BANK ADDRESS portion of SRAC, which has m bits, where $2^m$ is the number of banks of component VRAMs in VRAM 4. Each bank of VRAM 4 has a respective bank select decoder for decoding the BANK ADDRESS portion of SRAC, analogous to bank select decoder 37 for bank 40 of VRAM 4. All component VRAMs in VRAM 4 have respective $\overline{TR/OE}$ pins (not shown). All these TR/OE pins receive in parallel a LOW logic condition as a TRANSFER signal at times of transfer of a row of data in any one of VRAM 4 banks to the static memory therein from which serial output port is supplied data. The $\overline{TR/OE}$ pins for a selected bank also receive a LOW logic condition as an OUTPUT ENABLE signal when the random-access output/input port is accessed in an aspect of operation not connected with the present invention. The TRANSFER signal is executed as a command only when a ROW ADDRESS STROBE signal is applied to a RAS pin of each component VRAM involved. Bank address decoder 37 applies a high-to-low transition only to the RAS pins of the selected bank 40 of component VRAMs 41–48 when a row of data is to be transferred into the auxiliary-static-memory portions of component VRAMs 41–48.

A row/column address multiplexer 38 applies ROW ADDRESS to the eight ADDRESS pins of the component VRAMs 41–48 to indicate which row of data is being transferred for serial output. $\overline{RAS}$ is then allowed to go high, and column address multiplexer 38 applies COLUMN ADDRESS to the eight ADDRESS pins of component VRAMs 41–48. A COLUMN ADDRESS STROBE is applied to the $\overline{CAS}$ pins of VRAMS 41–48; this signal going low loads the internal address counters of VRAMs 41–48 with appropriate offsets for serial read out. $\overline{CAS}$ is then allowed to go high.

A pixel clock multiplexer 39 selects between the GREEN/DETAIL SERIAL OUTPUT CLOCK and RED/BLUE SERIAL OUTPUT CLOCK signals for application to the serial clock or SC pins of the component VRAMs. Bank address decoder 37 applies a low condition to the pins of only the selected bank 40 of component VRAMs as a SERIAL OUTPUT ENABLE signal during the serial output from VRAM 4.

This conditions the serial output ports of component VRAMs 41-48 to be multiplexed to the 32-bit-wide bus 6. The GREEN/DETAIL SERIAL OUTPUT CLOCK and RED/BLUE SERIAL OUTPUT CLOCK are both generated by a respective programmable division from a MASTER CLOCK signal.

Details of the construction of the formatter 7 for parsing the successive 32-bit words from the serial output port bus 6 into pixels are shown in FIG. 5. A 32-bit word register 50 holds thirty-two successive bits, a number n of the most significant of these bits being the code descriptive of green/detail, red or blue. The number n is constrained to be no larger than eight. A programmable mask register 51 holds a group of n ONEs in the most significant of its eight bit places and a group of (8−n) ZEROs in the least significant bit places. The contents of mask register 51 and the eight most significant bits of the word contained in register 50 have their corresponding bit places ANDed in a bank 52 of AND gates to furnish selected signal pixels of luminance or chrominance data. Where these data are shorter than eight bits, the bit places of lesser significance are filled by ZEROs.

When the first thirty-two bit word in a row of VRAM 4 is supplied to formatter 7 via serial output port bus 6, a multiplexer 53 admits that word to the 32-bit word register 50. The n most significant bits of that word defining a pixel datum are provided to the digital-to-analog converter 8 shown in FIG. 1 in the case where a green/detail bit-map in VRAM 4 is scanned, or are provided to an appropriate one of the line store RAMs 101-104 of chroma resampling apparatus 10 in the case where a red, blue or red/blue bit-map in VRAM 4 is being scanned.

When the next (32−n)/n pixel data are being provided to digital-to-analog converter 8 or to resampling apparatus 10, multiplexer 53 successively admits the (32−n)/n successive output of a 32-bit multi-bit shifter 54 to word register 50. Shifter 54 shifts n bits toward increased significance with each successive pixel as timed by PIXEL CLOCK pulses.

As the modulo-n first pixel datum is to be provided to digital-to-analog converter 8 or to resampling apparatus 10, multiplexer 53 admits a new 32-bit word into register 50 instead of shifting the old word. Multiplexer 53 can be controlled by decoding one output of a modulon pixel counter, for example. This counter can consist of the last n stages of a modulo-32 counter counting at pixel clock rate, which counter together with a binary shifter comprises multi-bit shifter 54.

One skilled in the art and provided with the foregoing description of the interface between VRAM 4 and formatter 7 will readily discern possible variants in the VRAM 4 digital word organization and changes in the formatter 7 architecture to accommodate these variants. With each thirty-two-bit word read from VRAM 4, the pixel order may be opposite to that described, for example, in which case formatter 7 structure is altered as follows. The programmable mask register 51 holds a group of n ONEs in its least significant (rather than most significant) bit places. The group of (8−n) ZEROs are held in the most significant bit places of mask register 51. The bank 52 of eight AND gates receives input from the eight least significant (rather than most significant) bit places of word register 50, as well as receiving input from mask register 51 with its modified mask contents. The multi-bit shifter 54 shifts n bits towards decreased significance (rather than increased significance) with each successive pixel as timed by PIXEL CLOCK pulses. Another variation readily conceived of is that the column or word read addresses in VRAM 4 may either increment or decrement as the display is horizontally scanned.

Figure 6:
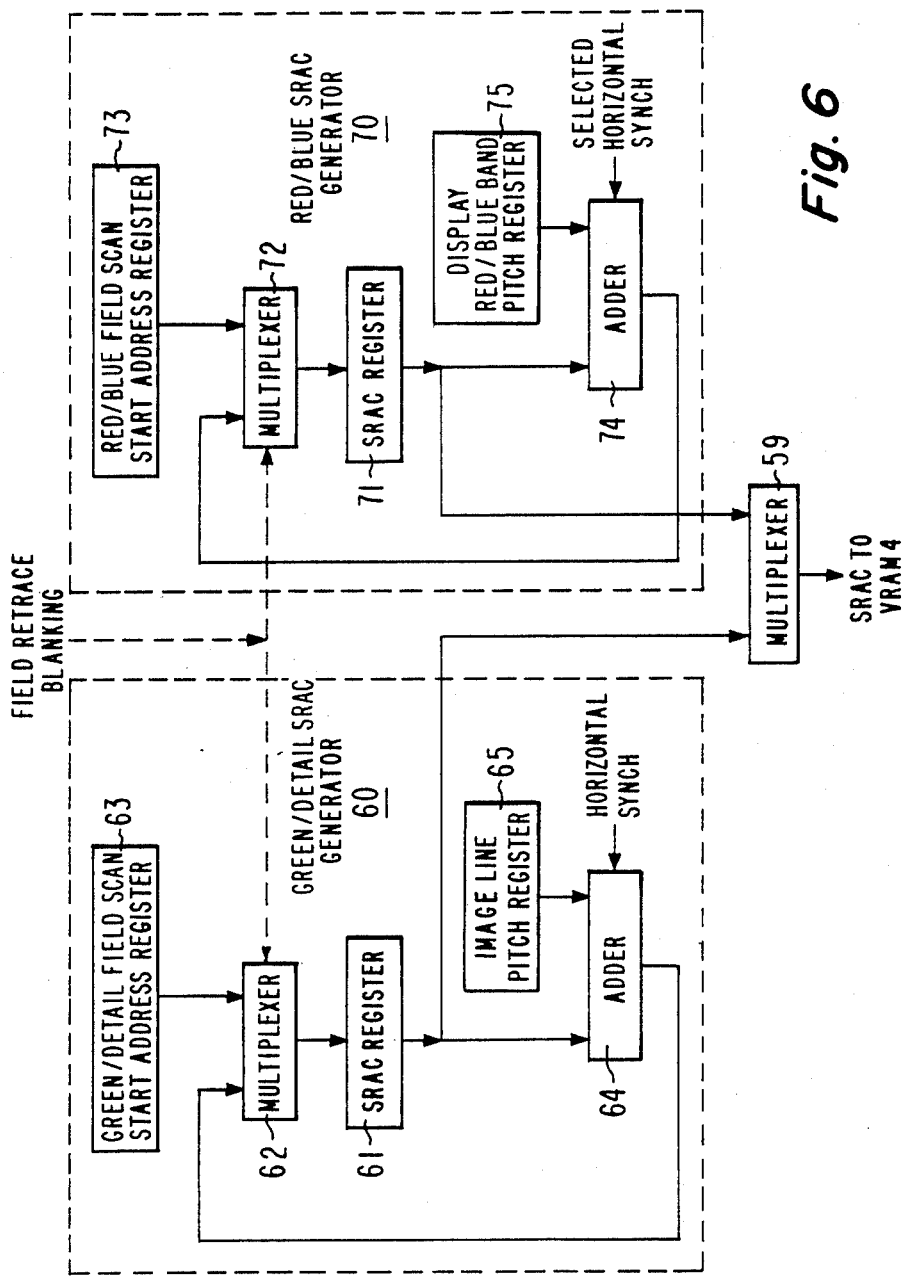
FIG. 6 is a schematic diagram of circuitry for generating the serial output port addressing for the FIG. 5 memory architecture.

FIG. 6 shows details of construction of the portion of VRAM read-out control 17 that generates SRAC in FIG. 1. SRAC is supplied to VRAM 4 from the output of a multiplexer 59 that selects the correct SRAC for the bit-map organization currently being scanned. This facilitates keeping track of where each scanning is along the linearly packed data of its particular bit-map organization. Two SRAC generators 60 and 70 are shown. Generator 60 generates SRAC for successive lines of green/detail pixel data. Generator 70 generates SRAC for successive lines of red/blue pixel data. To permit just one SRAC generator 70 for both red and blue rather than having to have two respective SRAC generators, these descriptions are linearly packed in VRAM 4, interleaving red and blue samples on a line by line basis.

SRAC generator 60 includes a SRAC latch register 61 for supplying a SRAC to one of the two inputs of multiplexer 59. SRAC latch register 61 contents are updated from the output of a multiplexer 62, controlled by FIELD RETRACE BLANKING pulses. During field retrace the FIELD RETRACE BLANKING pulse causes multiplexer 62 to select GREEN/DETAIL FIELD SCAN START ADDRESS supplied from a short address register 63, for updating register 61 contents. GREEN/DETAIL FIELD SCAN START ADDRESS identifies the storage location in VRAM 4 of the green/detail pixel in the upper left corner of the following field. These GREEN/DETAIL FIELD SCAN START ADDRESSES are selected in prescribed order from a listing in a portion of main computer memory reserved for storing display instructions, and the listing of GREEN/DETAIL FIELD SCAN START ADDRESSES is maintained by the drawing processor 3.

During field trace intervals in time, the absence of FIELD RETRACE BLANKING pulse causes multiplexer 62 to select the sum output of an adder 64 for updating SRAC latch register 61 contents. Adder 64 has addenda supplied to it from SRAC latch register 61 and from a programmable display line pitch latch register 65. IMAGE LINE PITCH stored in latch register 65 is the product of the number of green/detail samples per image line times the number of bits describing green/detail per green/detail sample times the reciprocal of the number of bits per column address in VRAM 4—i.e., the number of bits describing green/detail per image line divided by thirty-two. Elements 61-65 are operated as an accumulator augmenting SRAC by IMAGE LINE PITCH during each line retrace interval. IMAGE LINE PITCH is loaded into latch register 65 by drawing processor 3. IMAGE LINE PITCH originates in compact disc player 2 or other video source, and it can be convenient to carry it in FIELD HEADER DATA preceding each field of bit-map-organized green/detail or red/blue pixel data in VRAM 4.

SRAC generator 70 includes a SRAC latch register 71 for supplying a SRAC to the other of the two inputs of multiplexer 59, not supplied a SRAC from SRAC latch register 61 of SRAC generator 60. SRAC latch register 71 contents are updated from the output of a multiplexer 72 controlled by FIELD RETRACE BLANKING pulses. During a FIELD RETRACE BLANKING pulse, multiplexer 72 selects a RED/BLUE FIELD SCAN START ADDRESS supplied from a start address register 73, for updating register 71 contents. RED/BLUE FIELD SCAN START ADDRESS identifies the storage location in VRAM 4 of the red pixel in the upper right corner of the following field. These RED/BLUE FIELD SCAN START ADDRESSES are listed together with GREEN/DETAIL FIELD SCAN START ADDRESSES in the portion of main computer memory reserved for storing display instructions, and the listing of these RED/BLUE FIELD SCAN START ADDRESSES is maintained by the drawing processor 3.

During field trace intervals in time, the absence of FIELD RETRACE BLANKING pulse causes multiplexer 72 to select the sum output of an adder 74 for updating SRAC latch register 71 contents. Adder 74 has addenda supplied to it from SRAC latch register 71 and from a programmable display band pitch register 75. A display band is the number of display lines between the resampling of red and blue values. DISPLAY BAND PITCH stored in latch register 75 is the product of the number of red and blue samples per display band times the number of red-descriptive and blue-descriptive bits per sample times the reciprocal of the number of bits per column address in VRAM 4—i.e., the number of red-descriptive and blue-descriptive bits per display band divided by thirty-two. Elements 71–75 are operated as an accumulator augmenting SRAC by DISPLAY BAND PITCH during selected line retrace intervals separated by intervening display band intervals. DISPLAY BAND PITCH is loaded into latch register 75 by drawing processor 3 and originates similarly to IMAGE LINE PITCH.

Figure 7:
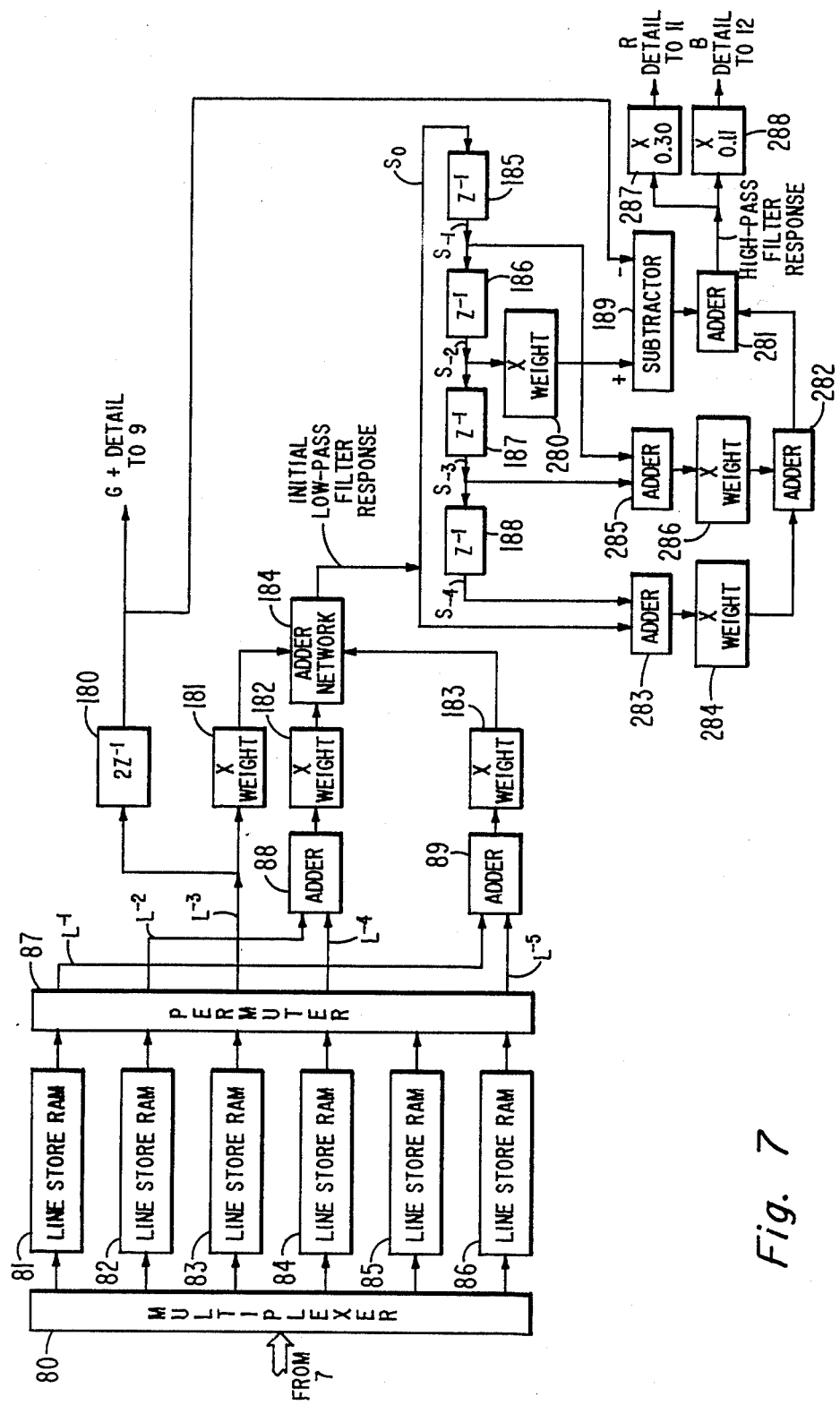
FIG. 7 is a schematic diagram showing the details of a digital filter network for separating detail information in the FIG. 1 television display system, which can also provide for rate-buffering of wideband color information read out of VRAM.

FIG. 7 shows in detail a form that digital filter network 8 of FIG. 1 may take. Essentially filter network 8 is a finite-impulse-response two-dimensional high-pass spatial-frequency filter. The linear-phase high-pass response is generated by subtracting a linear-phase low-pass response to input signal from the input signal itself on a sample-by-sample basis. The low-pass filter used to obtain this low-pass response is shown as one of separable type, cascading an initial filter and a final filter. The initial filter is used for obtaining a low-pass response in the direction perpendicular to scan lines, and the final filter is used for low-pass filtering that response in the scan line direction. A five-sample-by-five sample kernel is used, by way of example, since it can be drawn on one plate of drawing; in practice a seven-sample-by-seven-sample or nine-sample-by-nine-sample kernel may be preferred.

A multiplexer 80 during successive line trace intervals cyclically selects from line store RAMs 81–86 the one of them into which the green/detail pixel data are written from formatter 7 output. A permuter 87 selects the read-outs from the others of RAMs 81–86 and arranges them in successive line order. (In actuality, multiplexer 80 is usually not realized in hardware, but is provided for in the control circuitry controlling the application of write enable signals to a selected one of RAMs 81–86. This control circuitry and the control circuitry controlling the application of write enable signal to a selected one of RAMs 101–104 in the narrowband color resampling apparatus 10 of FIG. 1 control how the data on the output bus from formatter 7 are routed during line trace and line retrace intervals in a more comprehensive time-division-multiplexing function.)

Storing the line of green/detail samples being currently read from VRAM 4 until the next line trace interval is advantageous in that it readily permits the one of RAMs 81–86 selected for writing to be written at different clock rate than the others selected for reading, if this is desired. However, an extra line store RAM is required, and VRAM 4 must be read out through serial-access port 6 with a three-scan-line lead in time. Only a two-scan-line lead in time would be necessary if the RAM selected for writing were read from immediately after its writing, or if the current line of green/detail data were directly to enter the weighting and summing processes of digital filtering.

The most current line information $L_0$ is not read from RAMs 81–86 in the arrangement shown, then. The third most current scan line information $L_{-2}$ and the next to oldest scan line information $L_{-4}$ immediately flank the fourthmost current scan line information $L_{-3}$ in the direction perpendicular to scan lines. The samples of initial filter response are spatially aligned with the $L_{-3}$ samples, as mapped into the time domain. The $L_{-3}$ samples are subjected to a two-unit-pixel delay in a clocked delay line 180, to generate detail plus narrowband green samples that are spatially aligned with the final filter response as mapped to the time domain. The $L_{-3}$ samples are also weighted by the central samples of the kernel of the initial filter by a weighting multiplier 181. Spatially aligned samples of $L_{-2}$ and $L_{-4}$ are also aligned temporally because the ones of line store RAMs 81–86 being read from are addressed similarly, in unison; and the temporally aligned $L_{-2}$ and $L_{-4}$ samples are summed together in an adder 88. The running sum of these samples is weighted by a weighting multiplier 182. The secondmost current scan line information $L_{-1}$ and the oldest scan line information $L_{-5}$ flank the $L_{-2}$, $L_{-3}$ and $L_{-4}$ scan line information in the direction perpendicular to scan lines. Concurrent samples of $L_{-1}$ and $L_{-5}$ scan lines are summed together in an adder 89, and the resulting sum samples are weighted by a weighting multiplier 183. The weighted outputs if weighting multipliers 181–183 are added in an adder network 184 to produce the initial filter response, which is low-pass spatially filtered in the direction perpendicular to scan lines, and which is the convolution of the green/detail portion of image with the kernel of the initial filter. This initial filter response contains detail information only in the direction along scan lines and contains narrowband green information in both the directions along and perpendicular to scan lines. The samples of this initial filter response are spatially aligned with the $L_{-3}$ samples, as mapped into the time domain.

Successive samples of the initial filter response are supplied as input to a tapped-delay-line structure including four cascaded unit-pixel delay stages 185–188, which generates the additional samples that are needed for low-pass filtering in the direction of scan line extension. The low-pass response is to be subtractively combined with the detail plus narrowband green signal from the output of clocked delay line 80. This subtraction is shown in FIG. 7 as being done by taking advantage of the associative properties of addition and subtraction to allow a minimal adder free. The output of clocked delay line 180 is applied as subtrahend to a digital subtractor 189. Subtractor 189 receives as its minuend $S_{-2}$ samples which are the sampled-data final filter response as delayed by two-pixels in unit-pixel-delay stages 185 and 186 and subsequently weighted by a weighting multiplier 280. The difference output of subtractor 189 is supplied as an addend to a digital adder 281, receiving as its other addend the sum output of a digital adder 282. Adder 282 sum output is the weighted-and-summed response to samples $S_O$ of undelayed initial filter response, samples $S_{-1}$ of initial filter response as delayed by unit-pixel delay stage 185, samples $S_{-3}$ of initial filter response as delayed by the cascade of unit-pixel-delay stages 185–187, and of samples $S_{-4}$ of initial filter response as delayed by the cascade of unit-pixel-delay stages 185–188. The high-pass filter response appears directly as adder 281 sum output.

The generation of addenda for adder 282 is as follows. $S_O$ and $S_{-4}$ samples from the tapped delay line structure 185–188 are summed in a digital adder 283, and the sum output of adder 283 is weighted by a weighting multiplier 284 to generate one added supplied to adder 282. $S_{-1}$ and $S_{-3}$ samples from the tapped-delay-line structure 185–188 are summed in a digital adder 285; and the sum output of adder 285 is weighted by a weighting multiplier 286 to generate the other addend supplied to adder 282.

Finally, the red detail signal applied to adder 11 in FIG. 1 is generated by weighting the high-pass filter response from adder 281 by a factor of 0.30 in a weighting multiplier 287. And the blue detail signal supplied to adder 12 in FIG. 1 is generated by weighting the high-pass filter response from adder 281 by a factor of 0.11 in a weighting multiplier 288. The factors 0.30 and 0.11 are expressed here as decimal fractions, and the binary fraction equivalents are used in weighting adder 281 sum output of weighting multipliers 287 and 288. These factors presume the use of NTSC phosphors in the color kinescope and suitable adjustments for other phosphors are readily made by one skilled in television colorimetry. One skilled in the art of digital filter design can readily design other forms of the digital filter network 8.

The manner in which video information is packed into the VRAM in accordance with aspects of the invention will now be described in further detail. In those detailed descriptions it will be assumed that the green/detail, red and blue samples are of equal bit length so formatter 7 need not have sophisticated pixel-unwrapping capability. Before dealing with the way that the VRAM is organized in accordance with the invention when red and blue are sampled less densely in image space than green/detail, consider the way that the VRAM is organized when red, blue and green are sampled with equal densities in image space. Sampling red, blue and green with equal densities is feasible to do when the filter network 8 is operated as a rate-buffer memory.

Figure 8:
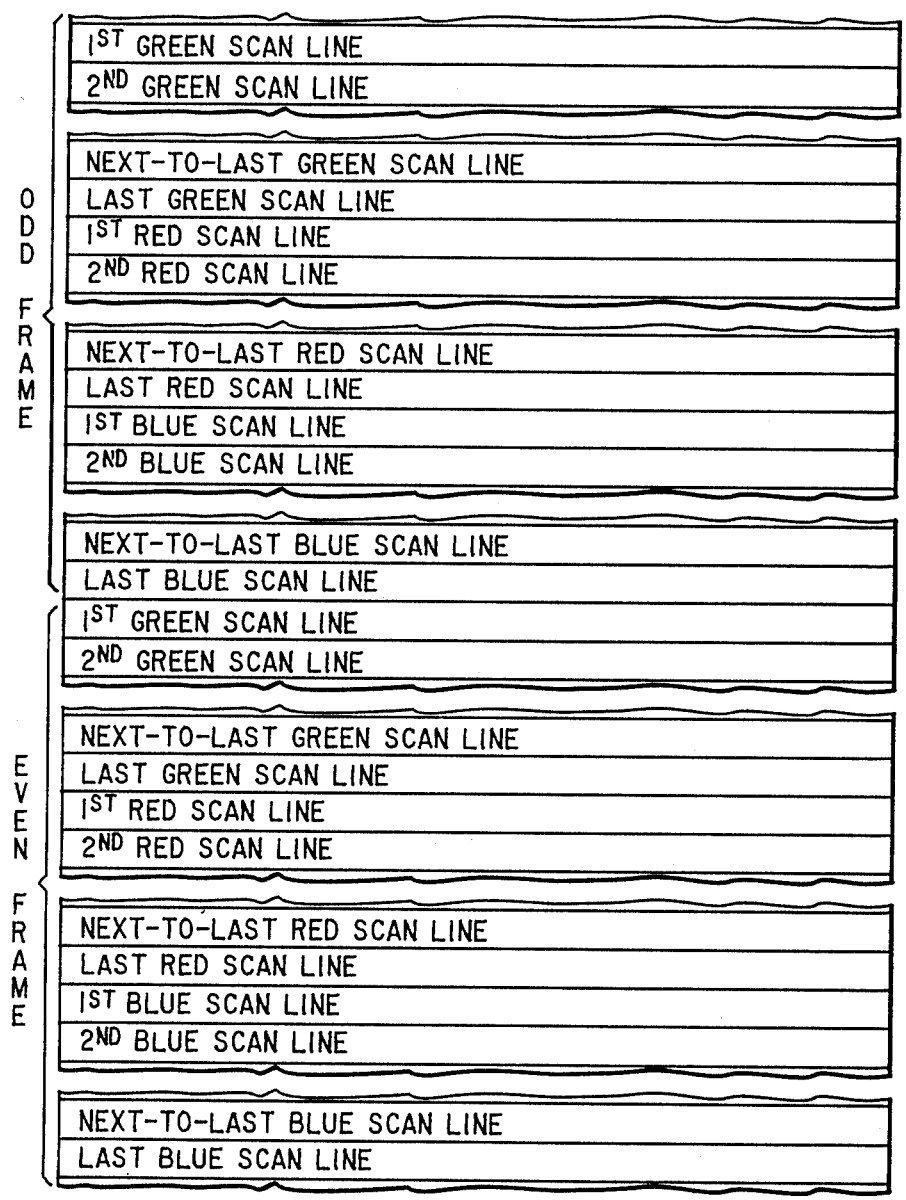

FIG. 8 shows one way that separate bit-map organizations for green, red and blue pixel variables may appear in VRAM 4 when this is done. An odd frame and an even frame of video are stored in VRAM 4, one frame being updated while the other is read out to support the generation of the image displayed on kinescope 16. The first through last scan lines of the green content of each frame are stored in respective successive rows of VRAM 4, each of which rows is represented by a respective rectangle extending from left to right in the drawing. The first through the last scan lines of the red content of each frame are similarly stored. So are the first through last scan lines of the blue content of each frame.

The rows containing the third through second-from-last scan lines of green, red and blue in each frame are omitted from FIG. 8 because of the difficulties involved showing all rows in VRAM 4, as are the VRAM rows outside image memory. For each of the pixel variables green, red and blue, the variables are expressed in serial form and concatenated in order of pixel scan during line trace in the display to generate the bit stream, successive bits of which occupy successive columnar locations in the VRAM 4 row.

In reading out from VRAM 4 the green, red and blue scan lines for each successive line of display are read out in cyclic succession. The VRAM image memory packing shown in FIG. 8 requires a complex pattern of row addressing to implement this. In addition to the green/detail SRAC generator 60, two SRAC generators like 70 in FIG. 6 are required, one for red and one for blue. The image line pitch register 65 and the corresponding band pitch registers store single image-line pitch values. The green/detail field scan start register 65 and the red and blue field scan start registers store start addresses offset by at least the number of image lines per frame.

It should be noted that when odd and even frames are described in connection with FIG. 8, this relates to the practice of displaying one frame while constructing the next frame in VRAM. Whether each frame is scanned on a one field per frame basis without line interlace, on a single-shuttered or plural-shuttered basis, or whether each frame is scanned on a two field per frame basis with line interlace on successive fields, in a single-shuttered or plural-shuttered basis, is essentially irrelevant to the VRAM packing. Whether line interlace on successive fields is used will, of course, be reflected in the pitch register contents in each of the SRAC generators.

Figure 9:
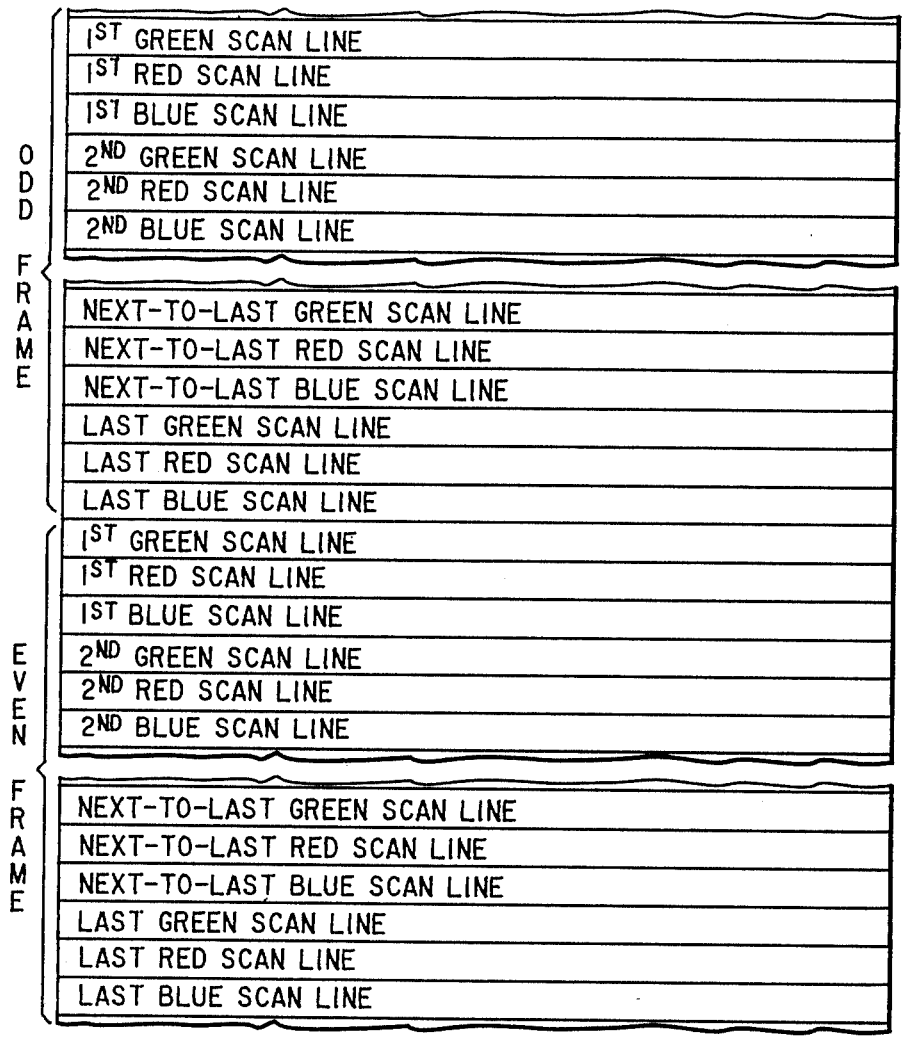

FIG. 9 illustrates how the lines of the separate bit-map organizations of green, red and blue can be interleaved with each other in writing the rows of VRAM 4, so that VRAM 4 can be read out using successive row addresses. These row addresses can be generated by SRAC generators similar to those described in connection with the VRAM packing shown in FIG. 8. However, the pitch registers store three-image line pitch values; and the green/detail field scan start register 63 and the field scan start address registers in the red and blue SRAC generators store values offset by one image line. Where programmability between the FIG. 9 VRAM packing and other types of packing is not sought, VRAM row read addresses may be simply generated by a counter. This principle for reducing the complexity of VRAM addressing may be applied in modified forms when red and blue are sampled less densely in image space than green/detail is, to permit the use of just a single red/blue SRAC generator 70.

Figure 10:
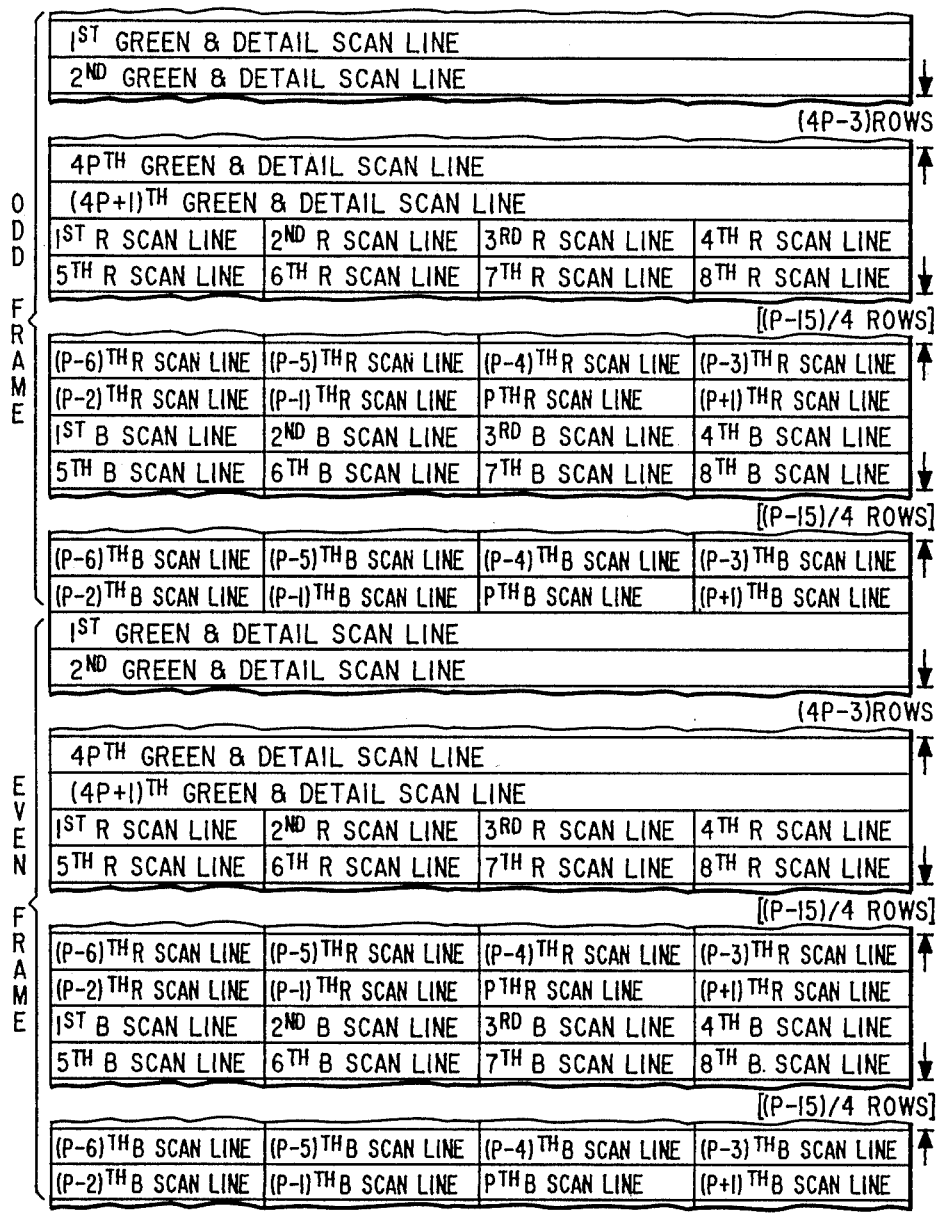

FIG. 10 shows how the separate bit-map organizations of green/detail, red and blue could appear in VRAM 4 when the memory packing scheme of FIG. 8 is adapted so that the red and blue samples of image space are one-quarter as dense as the green/detail samples in both the pixel-scan and line-advance directions in the television display system of FIG. 1. The red and blue interpolators 105 and 106 take the form shown in FIG. 4, or its equivalent. There is an integral number $P+1$ of scan lines for each of the red and blue values. Accordingly, there is an odd-numbered plurality $(4P+1)$ of scan lines for red and blue. For example: P might be 63, so $C_1$ and $C_2$ each have 64 scan lines and Y has 253 scan lines. FIG. 10 assumes $P+1$ to be evenly divisible by four. Where this is not the case, some of the rows in VRAM 4 will not be completely packed with $C_1$ and $C_2$ data. FIG. 10 also supposes green/detail, red and blue variables to have the same number of bits for amplitude resolution, and that number of bits multiplied by the samples of green/detail per line to equal the number of bits per row in VRAM. In this type of VRAM packing, separate SRAC generators are required for red and for blue in addition to the green/detail SRAC generator 60.

Figure 11:
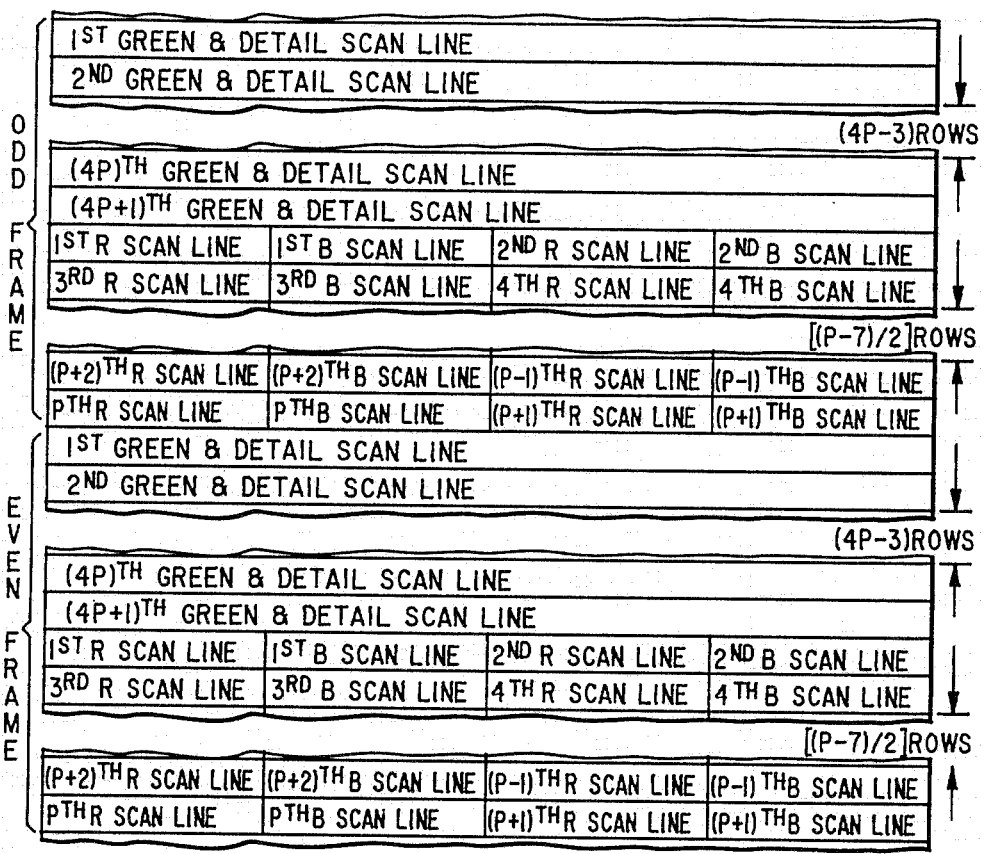

FIG. 11 shows how the VRAM packing used in FIG. 10 is modified using the principle previously taught in connection with FIG. 9. Red and blue scan lines are alternated in the rows of VRAM 4 so they may be scanned by successive row and column address values when being read during line retrace. This advantageously permits the use of just one red/blue SRAC generator 70 together with green/detail SRAC generator 60. Note that band pitch register 75 contents will treat a pair of simultaneously displayed red and blue scan lines as the unit of pitch.

Figure 12:
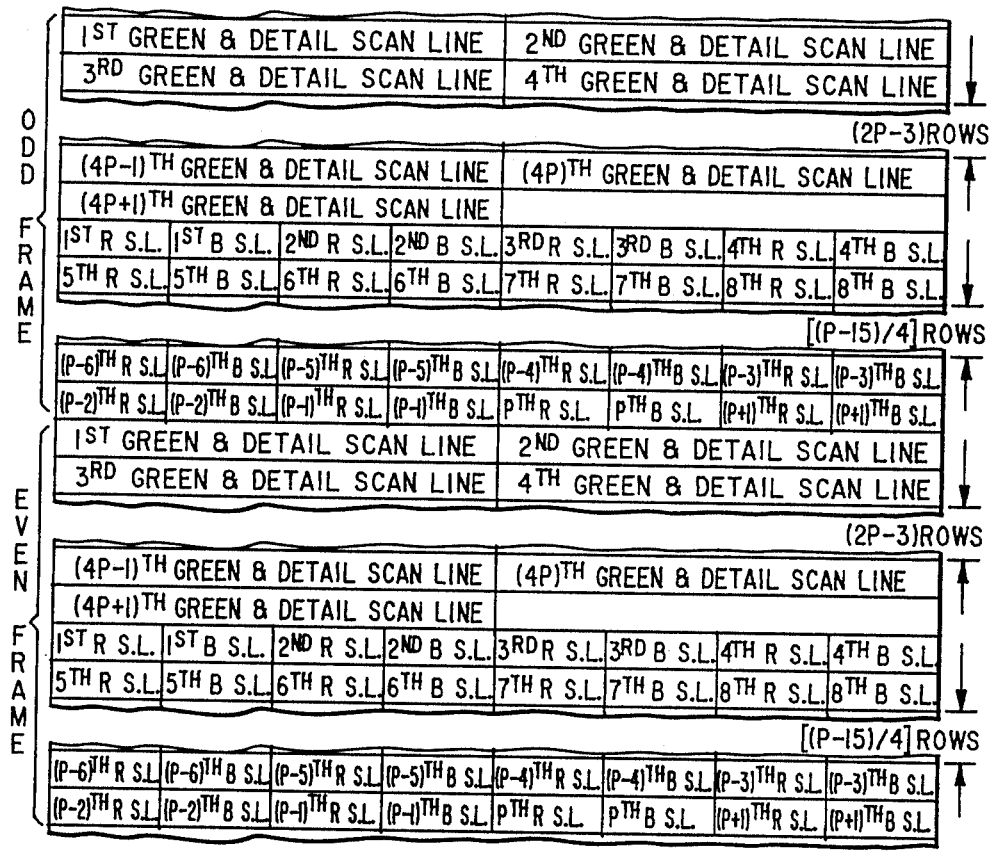

FIG. 12 shows how the FIG. 12 VRAM packing is changed when the product of the number of bits per green/detail sample times the number of green/detail samples per scan line are reduced to one-half the number of bits per row of VRAM 4. Comparing FIGS. 11 and 12, it should be apparent how VRAM 4 packing is affected when this product is reduced to smaller binary fractions of the number of bits per row of VRAM 4. Note that packing of the last green/detail scan lines or red/blue scan lines will not always be perfect.

As shown in FIG. 13, this packing inefficiency can be avoided without having to resort to complicated VRAM row addressing schemes. To do this, odd-frame green/detail and even-frame green/detail data are concatenated for storage in successive rows of VRAM 4. Also, odd-frame red/blue and even-frame red/blue are concatenated for storage in successive rows of VRAM 4, which will help packing efficiency when P+1 is not evenly divisible by four. This packing scheme also facilitates the start of red/blue data packing in a part of a VRAM row left vacant by green/detail.

One skilled in the art and equipped with the principles taught in describing FIGS. 8-13 can readily design a variety of VRAM packing schemes consonant with the invention. For example, where formatter 7 has more sophisticated pixel-unwrapping capability, scan lines of pixel variables can be packed more compactly in VRAM rows.

What is claimed is:

1. A system for storing and retrieving electric signals descriptive of color images, said system comprising:
    a video random-access memory having a multiplicity of storage locations, an input port and a serial-access output port;
    means for writing electric signals descriptive of color images into said video random-access memory via its input port for storage in storage locations thereof in accordance with separate bit-map organizations for combined detail and narrowband first primary color information, for narrowband second primary color information, and for narrowband third primary color information;
    means for selecting successive rows of storage locations storing combined detail and narrowband first primary color information for reading out from said video random-access memory via its serial-access output port, one line of combined detail and narrowband first primary color information during each display line trace interval;
    means for selecting successive rows of storage locations storing narrowband second primary color information and narrowband third primary color information for read out from said video random-access memory via its serial-access output port, during selected display line retrace intervals;
    means for resampling said narrowband second primary color information to the same sampling density as said combined detail and narrowband first primary color information;
    means for temporally aligning corresponding samples of combined detail and first primary color information, of second primary color information of the same sampling density and of third primary color information of the same sampling density; and
    means for generating wideband component color signals in response to said temporally aligned corresponding samples of combined detail and narrowband first primary color information, of said second primary color information, including
    means for separating detail information from said combined detail and narrowband firt primary color information,
    means for combining said separated detail information with said resampled narrowband second primary color information in proportions to generate a wideband second primary color signal, and
    means for combining said separated detail information with said resampled narrowband third primary color information in proportions to generate a wideband third primary color signal.

2. A system as set forth in claim 1 wherein said first primary color is green, said second primary color is red, and said third primary color is blue.

3. A system as set forth in claim 2 wherein samples of said combined detail and narrowband first primary color information are coded in more bits than samples of said narrowband second primary color information are and wherein samples of said narrowband second primarily color information are coded in more bits than samples of said narrowband third primary color information are.

4. A system as set forth in claim 1 wherein, at least at times, said video random-access memory uses a relatively densely sampled bit-map organization for combined detail and narrowband first primary color information and at least one relatively sparsely sampled bit-map organization for second primary color and third primary color information.

5. A system as set forth in claim 4 wherein said bit-map organizations are linearly packed in said video random-access memory.

6. A system for storing and retrieving electric signals descriptive of color images, said system comprising:
    a video random-access memory having a multiplicity of storage locations, an input port and a serial-access output port;
    means for writing electric signals descriptive of color images into said video random-access memory via its input port for storage in storage locations thereof in accordance with a relatively densely sampled bit-map organization for detail and first primary color information and at least one relatively sparsely sampled bit-map organization for second primary color and third primary color information;

means for selecting successive rows of storage locations storing combined detail and first primary information in said densely sampled bit-map organization for reading out from said video random-access memory via its serial-access output port, one scan line of combined detail and first primary information during each line trace interval of display;

means, high pass spatially filtering the detail and first primary color information read out from the serial-access output port of said video random-access memory during line intervals, for generating sampled detail-only information with an attendant delay:

means for generating a wideband first primary color signal from the combined delayed detail and first primary color information, which means delays the detail and first primary color information read out from the serial access port of said video random-access memory during line intervals in amount equal to said delay attendant to the generation of sampled detail-only information;

means for selecting successive rows of storage locations storing second primary color and third primary color information in said sparsely sampled bit-map organization for read out from said video random-access memory via its serial-access output port, during selected line retrace intervals of display;

a first line storage memory, for storing samples of odd-numbered scan lines of second primary color information, having an input port to which the serial-access output port of said video random-access memory is connected, and having an output port;

a second line storage memory, for storing samples of even-numbered scan lines of second primary color information, having an input port to which the serial-access output port of said video random-access memory is connected, and having an output port;

a first two-dimensional spatial interpolator of pipe-line type, having two input ports and an output port;

means operative during selected times for reading out from the output ports of said first and second line storage memories in parallel to the input ports of said first two-dimensional spatial interpolator said selected times being such as to temporally align second primary color information samples supplied from the output port of said first two-dimensional spatial interpolator with corresponding wideband first primary color information samples supplied from said means for generating a wideband first primary color signal;

a third line storage memory, for storing samples of odd-numbered scan lines of third primary color information, having an input port to which the serial-access output port of said video random-access memory is connected, and having an output port;

a fourth line storage memory, for storing samples of even-numbered scan lines of third primary color information, having an input port to which the serial-access output port of said video random-access memory is connected, and having an output port;

a second two-dimensional spatial interpolator of pipe-line type, having two input ports and an output port;

means operative during selected times for reading out from the output ports of said third and fourth line storage memories in parallel to the input ports of said second two-dimensional spatial interpolator, said selected times being such as to temporally align third primary color information samples supplied from the output port of said second two-dimensional spatial interpolator with corresponding wideband first primary color information samples supplied from said means for generating; and means for generating component color signals in response to said temporally aligned samples of first primary color information, second primary color information and third primary color information.

7. A system as set forth in claim 6 wherein said first primary color is green, said second primary color is red, and said third primary color is blue.

8. A system as set forth in claim 7 wherein samples of said combined detail and narrowband first primary color information are coded in more bits than samples of said narrowband second primary color information are, and wherein samples of said narrowband second primary color information and coded in more bits than samples of third primary color information are.

9. A system as set forth in claim 6 wherein said first two-dimensional spatial interpolator of pipe-line type comprises:

a first multiplexer for selection on a scan line by scan line basis between, on the one hand, read-out supplied to one input port of said first two-dimensional spatial interpolator from the output port of said first line storage memory and, on the other hand, read-out supplied to the other input port of said first two-dimensional spatial interpolator from the output port of said second line storage memory;

means for making simultaneously available the current selection and the just previous selection of said first multiplexer;

means for obtaining half the sum of the current selection of said first multiplexer and of its just previous selection;

means for summing the read-outs supplied the input ports of said first two-dimensional spatial interpolator from the output ports of said first and second line storage memories;

means for matrixing simultaneously available, on the one hand, half the sum of the just previous read-outs supplied the input ports of said first two-dimensional spatial interpolator and, on the other hand, one quarter the sum of the current and just-previous read-outs supplied the input ports of said first two-dimensional spatial interpolator; and a second multiplexer for selecting on a pixel by pixel basis among the just-previous selection of said first multiplexer, half the sum of the current selection of said first multiplexer and of its just previous selection, half the sum of the just-previous read-outs supplied to the input ports of said first two-dimensional spatial interpolator, and one-quarter the sum of the current and just-previous read-outs supplied to the input ports of said first two-dimensional spatial interpolator—and wherein said second two-dimensional spatial interpolator of pipe-line type comprises:

a third multiplexer for selection on a scan line by scan line basis between, on the one hand, read-out supplied to one input port of said second two-dimensional spatial interpolator from the output port of said third line storage memory and, on the other hand, read-out supplied to the other input port of said second two-dimensional spatial interpolator from the output port of said fourth line storage memory;

means for making simultaneously available the current selection and the just previous selection of said third multiplexer;

means for obtaining half the sum of the current selection of said third multiplexer and of its just previous selection;

means for summing the read-outs supplied the input ports of said second two-dimensional spatial interpolator from the output ports of said third and fourth line storage memories;

means for making simultaneously available, on the one hand, half the sum of the just previous read-outs supplied the input ports of said second two-dimensional spatial interpolator and, on the other hand, one quarter the sum of the current and just-previous read-outs supplied the input ports of said second two-dimensional spatial interpolator; and a fourth multiplexer for selecting on a pixel by pixel basis among the just-previous selection of said third multiplexer, half the sum of the current selection of said third multiplexer and of its just previous selection, half the sum of the just-previous read-outs supplied to the input ports of said second two-dimensional spatial interpolator, and one-quarter the sum of the current and just-previous read-outs supplied to the input ports of said second two-dimensional spatial interpolator.

10. A system as set forth in claim 6 wherein said first two-dimensional spatial interpolator of pipe-line type comprises:

an output multiplexer for said first two-dimensional spatial interpolator, which has first and second input ports and has an output port that is the output port of said first two-dimensional spatial interpolator; and a cascade connection of a first plurality two-input-terminal, two-output-terminal interpolator modules between the output ports of said first and second line storage memories and the input ports of said output multiplexer for said first two-dimensional spatial interpolator—wherein said second spatial interpolator of pipe-line type comprises;

an output multiplexer for said second two-dimensional spatial interpolator, which has the first and second input ports and has an output port that is the output port of said second two-dimensional spatial interpolator; and a cascade connection of a second plurality of two-input-terminal interpolator modules between the output ports of said third and fourth line storage memories and the input ports of said output multiplexer for said second two-dimensional spatial interpolator—and wherein each interpolator module in said first and second pluralities of interpolator modules comprises:

a respective input multiplexer for selection between first and second ones of the input terminals of that interpolator module;

respective means for making simultaneously available the current selection and the just-previous selection of the input multiplexer of that interpolator module;

means for obtaining half the sum of the current and just-previous selections of its respective input multiplexer;

a respective first output multiplexer for selecting to a first one of the output terminals of that interpolator module from between, on the one hand, the just-previous selection of the input multiplexer of that interpolator module and, on the other hand, said half the sum of the current and just-previous selections of the input multiplexer of that interpolator module;

respective means for summing the read-outs supplied to the first and second input terminals of that interpolator module;

respective means for making simultaneously available one half the just-previous sum of the read-outs supplied to the first and second input terminals of that interpolator module, and one quarter the sum of the current and just-previous sums of those read-outs; and a respective second output multiplexer for selecting to a second one of the output terminals of that interpolator module from between, on the one hand, one half the just-previous sum of the read-outs supplied to the first and second input terminals of that interpolator module and, on the other hand, one quarter the sum of the current and just-previous sums of those read-outs.

* * * * *

UNITED STATES PATENT AND TRADEMARK OFFICE
CERTIFICATE OF CORRECTION

PATENT NO. : 4,745,462

DATED : May 17, 1988

INVENTOR(S) : Robert Dischert  et al.

It is certified that error appears in the above-identified patent and that said Letters Patent is hereby corrected as shown below:

Column 7, line 10, should read "signal containing" instead of "signalcontaining"

Column 8, line 42, should read "separately" instead of "separatey"

Column 12, lines 5 and 6, should read "$2^{(n+1)}$ times, or one less time, where" instead of "$2^{(n+1)}$ times, or one less time, where"

Column 16, line 33, should read "$\overline{TR/OE}$" instead of "TR/OE"

Column 16, line 44, should read "$\overline{RAS}$" instead of "RAS"

Column 16, line 46, should read "$\overline{RAS}$" instead of "RAS"

Column 16, line 66, should read "$\overline{SOE}$ pins" instead of "pins"

Column 17, line 46, should read "modulo-n" instead of "modulon"

Signed and Sealed this

Twenty-fifth Day of October, 1988

Attest:

DONALD J. QUIGG

*Attesting Officer*      *Commissioner of Patents and Trademarks*